United States Patent
Goldenberg et al.

(10) Patent No.: US 7,327,348 B2
(45) Date of Patent: Feb. 5, 2008

(54) HAPTIC FEEDBACK EFFECTS FOR CONTROL KNOBS AND OTHER INTERFACE DEVICES

(75) Inventors: Alex S. Goldenberg, Mountain View, CA (US); Steven P. Vassallo, Redwood City, CA (US); Kenneth M. Martin, Los Gatos, CA (US); Adam C. Braun, Sunnyvale, CA (US)

(73) Assignee: Immersion Corporation, San Jose, CA (US)

( * ) Notice: Subject to any disclaimer, the term of this patent is extended or adjusted under 35 U.S.C. 154(b) by 825 days.

(21) Appl. No.: 10/641,243

(22) Filed: Aug. 14, 2003

(65) Prior Publication Data

US 2004/0032395 A1 Feb. 19, 2004

Related U.S. Application Data

(63) Continuation of application No. 09/783,936, filed on Feb. 14, 2001, now Pat. No. 6,636,197, which is a continuation-in-part of application No. 09/680,408, filed on Oct. 2, 2000, now Pat. No. 6,686,911, and a continuation of application No. 09/678,110, filed on Oct. 2, 2000, now Pat. No. 6,956,558, which is a continuation of application No. 09/179,382, filed on Oct. 26, 1998, now Pat. No. 6,154,201, and a continuation of application No. 09/160,985, filed on Sep. 24, 1998, now Pat. No. 6,232,891, which is a continuation of application No. 09/049,155, filed on Mar. 26, 1998, now Pat. No. 6,128,006, which is a continuation of application No. 08/756,745, filed on Nov. 26, 1996, now Pat. No. 5,825,308.

(60) Provisional application No. 60/182,557, filed on Feb. 15, 2000.

(51) Int. Cl.
*G00G 5/00* (2006.01)

(52) U.S. Cl. ............... 345/156; 345/157; 345/158; 345/159; 345/184; 74/471 R; 318/568.11; 318/568.16

(58) Field of Classification Search ............... 345/156, 345/161, 163, 167, 184, 970, 157, 158, 159; 341/20, 35; 364/188; 463/30, 38; 74/471 R; 318/568.11, 568.16
See application file for complete search history.

(56) References Cited

U.S. PATENT DOCUMENTS 3,157,853 A 11/1964 Hirsch (Continued)

FOREIGN PATENT DOCUMENTS

EP 0349086 1/1990

OTHER PUBLICATIONS

Adachi, Y. et al., "Sensory Evaluation of Virtual Haptic Push-Buttons," Tehnical Research Center, Suzuki Motor Corp., 1994, pp. 1-7.

(Continued)

*Primary Examiner*—Bipin Shalwala
*Assistant Examiner*—Vincent E. Kovalick
(74) *Attorney, Agent, or Firm*—Kilpatrick Stockton LLP

(57) ABSTRACT

The present invention provides haptic sensations for a haptic feedback device and especially for a rotational device such as a knob. Force effects such as a hill force effect and barrier force effect allow easier selection of menu items, menus, values, or other options by the user. Force models are also described to allow greater selection functionality, such as a scrolling list with detents and rate control borders, a jog shuttle, a push-turn model, a double-push model, and a cast control model.

28 Claims, 10 Drawing Sheets

U.S. PATENT DOCUMENTS

| | | |
|---|---|---|
| 3,220,121 A | 11/1965 | Cutler |
| 3,497,668 A | 2/1970 | Hirsch |
| 3,517,446 A | 6/1970 | Corlyon et al. |
| 3,902,687 A | 9/1975 | Hightower |
| 3,903,614 A | 9/1975 | Diamond et al. |
| 3,919,691 A | 11/1975 | Noll |
| 4,050,265 A | 9/1977 | Drennen et al. |
| 4,131,033 A | 12/1978 | Wright et al. |
| 4,160,508 A | 7/1979 | Salsbury, Jr. et al. |
| 4,236,325 A | 12/1980 | Hall et al. |
| 4,477,043 A | 10/1984 | Repperger |
| 4,513,235 A | 4/1985 | Acklam et al. |
| 4,560,983 A | 12/1985 | Williams |
| 4,581,491 A | 4/1986 | Boothroyd |
| 4,599,070 A | 7/1986 | Hladky et al. |
| 4,706,294 A | 11/1987 | Ouchida |
| 4,708,656 A | 11/1987 | De Vries et al. |
| 4,712,101 A | 12/1987 | Culver |
| 4,713,007 A | 12/1987 | Alban |
| 4,782,327 A | 11/1988 | Kley et al. |
| 4,795,296 A | 1/1989 | Jau |
| 4,800,721 A | 1/1989 | Cemenska et al. |
| 4,823,634 A | 4/1989 | Culver |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,935,728 A | 6/1990 | Kley |
| 4,943,866 A | 7/1990 | Barker et al. |
| 4,964,004 A | 10/1990 | Barker |
| 4,979,050 A | 12/1990 | Westland et al. |
| 4,983,901 A | 1/1991 | Lehmer |
| 5,007,300 A | 4/1991 | Siva |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. |
| 5,078,152 A | 1/1992 | Bond |
| 5,095,303 A * | 3/1992 | Clark et al. ................. 345/164 |
| 5,107,080 A | 4/1992 | Rosen |
| 5,138,154 A | 8/1992 | Hotelling |
| 5,139,261 A | 8/1992 | Openiano |
| 5,146,566 A | 9/1992 | Hollis, Jr. et al. |
| 5,185,561 A | 2/1993 | Good et al. |
| 5,186,629 A | 2/1993 | Rohen |
| 5,186,695 A | 2/1993 | Mangseth et al. |
| 5,189,355 A | 2/1993 | Larkins et al. |
| 5,193,963 A | 3/1993 | McAffee et al. |
| 5,204,600 A | 4/1993 | Kahkoska |
| 5,212,473 A | 5/1993 | Louis |
| 5,220,260 A | 6/1993 | Schuler |
| 5,223,776 A | 6/1993 | Radke et al. |
| 5,235,868 A | 8/1993 | Culver |
| 5,240,417 A | 8/1993 | Smithson et al. |
| 5,254,919 A | 10/1993 | Bridges et al. |
| 5,271,290 A | 12/1993 | Fischer |
| 5,275,174 A | 1/1994 | Cook |
| 5,280,276 A | 1/1994 | Kwok |
| 5,296,846 A | 3/1994 | Ledley |
| 5,296,871 A | 3/1994 | Paley |
| 5,299,810 A | 4/1994 | Pierce |
| 5,309,140 A | 5/1994 | Everett |
| 5,313,230 A | 5/1994 | Venolia et al. |
| 5,317,336 A | 5/1994 | Hall |
| 5,334,027 A | 8/1994 | Wherlock |
| 5,355,148 A | 10/1994 | Anderson |
| 5,374,942 A | 12/1994 | Gilligan et al. |
| 5,381,080 A | 1/1995 | Schnell et al. |
| 5,389,865 A | 2/1995 | Jacobus et al. |
| 5,396,266 A | 3/1995 | Brimhall |
| 5,398,044 A | 3/1995 | Hill |
| 5,405,152 A | 4/1995 | Katanics et al. |
| 5,414,337 A | 5/1995 | Schuler |
| 5,457,479 A | 10/1995 | Cheng |
| 5,466,213 A | 11/1995 | Hogan |
| 5,473,344 A | 12/1995 | Bacon et al. |
| 5,477,237 A | 12/1995 | Parks |
| 5,491,477 A | 2/1996 | Clark et al. |
| 5,513,100 A | 4/1996 | Parker et al. |
| 5,530,455 A | 6/1996 | Gillick et al. |
| 5,541,379 A | 7/1996 | Kim |
| 5,542,672 A | 8/1996 | Meredith |
| 5,543,821 A | 8/1996 | Marchis et al. |
| 5,547,382 A | 8/1996 | Yamasaki |
| 5,576,727 A | 11/1996 | Rosenberg et al. |
| 5,589,828 A | 12/1996 | Armstrong |
| 5,589,854 A | 12/1996 | Tsai |
| 5,591,082 A | 1/1997 | Jensen et al. |
| 5,623,582 A | 4/1997 | Rosenberg |
| 5,625,576 A | 4/1997 | Massie et al. |
| 5,627,531 A | 5/1997 | Posso et al. |
| 5,642,469 A | 6/1997 | Hannaford et al. |
| 5,643,087 A | 7/1997 | Marcus et al. |
| 5,656,901 A | 8/1997 | Kurita |
| 5,666,138 A | 9/1997 | Culver |
| 5,666,473 A | 9/1997 | Wallace |
| 5,691,747 A | 11/1997 | Amano |
| 5,691,898 A | 11/1997 | Rosenberg et al. |
| 5,709,219 A | 1/1998 | Chen et al. |
| 5,712,725 A | 1/1998 | Faltermeier et al. |
| 5,714,978 A | 2/1998 | Yamanaka et al. |
| 5,721,566 A | 2/1998 | Rosenberg et al. |
| 5,724,068 A | 3/1998 | Sanchez et al. |
| 5,724,106 A | 3/1998 | Autry et al. |
| 5,734,373 A | 3/1998 | Rosenberg et al. |
| 5,736,978 A | 4/1998 | Hasser et al. |
| 5,742,278 A | 4/1998 | Chen et al. |
| 5,745,057 A | 4/1998 | Sasaki et al. |
| 5,749,577 A | 5/1998 | Couch et al. |
| 5,754,023 A | 5/1998 | Rosten et al. |
| 5,755,577 A | 5/1998 | Gillio |
| 5,760,764 A | 6/1998 | Martinelli |
| 5,766,016 A | 6/1998 | Sinclair |
| 5,767,839 A | 6/1998 | Rosenberg |
| 5,781,172 A | 7/1998 | Engel et al. |
| 5,785,630 A | 7/1998 | Bobick et al. |
| 5,787,152 A | 7/1998 | Freadman |
| 5,790,108 A | 8/1998 | Salcudean et al. |
| 5,805,140 A | 9/1998 | Rosenberg et al. |
| 5,808,568 A | 9/1998 | Wu |
| 5,808,603 A | 9/1998 | Chen |
| 5,823,876 A | 10/1998 | Unbehand |
| 5,825,308 A | 10/1998 | Rosenberg |
| 5,831,408 A | 11/1998 | Jacobus et al. |
| 5,841,428 A | 11/1998 | Jaeger et al. |
| 5,889,506 A | 3/1999 | Lopresti et al. |
| 5,889,670 A | 3/1999 | Schuler et al. |
| 5,889,672 A | 3/1999 | Schuler et al. |
| 5,912,661 A | 6/1999 | Siddiqui |
| 5,944,151 A | 8/1999 | Jakobs et al. |
| 5,959,613 A | 9/1999 | Rosenberg |
| 5,990,869 A | 11/1999 | Kubica et al. |
| 6,106,398 A * | 8/2000 | Davis ........................... 463/38 |
| 6,111,577 A * | 8/2000 | Zilles et al. ................ 715/701 |
| 6,219,034 B1 * | 4/2001 | Elbing et al. ............... 345/158 |
| 6,422,941 B1 * | 7/2002 | Thorner et al. ............... 463/30 |
| 6,429,849 B1 * | 8/2002 | An et al. ..................... 345/161 |

OTHER PUBLICATIONS

Adelstein et al., "Design and Implementation of a Force Reflecting Manipulandum for Manual Control Research," 1992, NASA Ames Research Center, pp. 1-25.

Adelstein, "Design and Implementation of a Force Reflecting Manipulandum for Manual Control research," DSC-vol. 42, Advances in Robotics, Edited by H. Kazerooni, pp. 1-12, 1992.

Adelstein, "A Virtual Environment System For The Study of Human Arm Tremor, " Ph.D. Dissertation, Dept. of Mechanical Engineering, MIT, Jun. 1989.

Akamatsu et al., "Multimodal Mouse: A Mouse-Type Device with Tactile & Force Display," 1994, Presence, vol. 3, p. 73-80.

Atkinson al., "Computing with Feeling, Computing & Graphics," vol. 2, 1977, p. 97-103.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Batter et al., "Grope 1: A Computer Display to the Sense of Feel," 1971, IFIP Congress, p. 759-763.

Bejczy et al., "A Laboratory Breadboard System For Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings Of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) For Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Brooks Jr., et al., "Project GROPE-Haptic Displays for Scientific Visualization," 1990, Computer Graphics, vol. 24, pp. 177-185.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Buttolo et al., "Pen-Based Force Display for Precision Manipulation in Virtual Environments," 1995, IEEE, pp. 217-224.

Caldwell et al., "Enhanced Tactile Feedback (Tele-Taction) Using a Multi-Functional Sensory System," 1050-4729/93, pp. 955-960, 1993.

Colgate et al., "Implementation of Stiff Virtual Walls in Force-Reflecting Interfaces," 1993, Dept. of Mech. Engineering, Northwestern University, pp. 1-7.

"Cyberman Technical Specification," Logitech Cyberman SWIFT Supplement, Apr. 5, 1994.

Eberhardt et al., "Including Dynamic Haptic Perception by The Hand: System Description and Some Results," DSC-vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Ellis et al., "Design & Evaluation of a High-Performance Prototype Planar Haptic Interface," 1993, ASME, vol. 49, pp. 55-64.

Fischer et al., "Specification and Design of Input Devices for Teleoperation," 1990, IEEE CH2876-1, pp. 540-545.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Gotow, J.K. et al., "Perception of Mechanical Properties at the Man-Machine Interface," IEEE CH2503-1/87/0000-0688, 1987, pp. 688-689.

Hannaford et al., "Force Feedback Cursor Control," 1989, NASA Tech Brief, vol. 13, p. 1-4.

Hayward et al., "Design & Multi-Objective Optimization of a Linkage for a Haptic Interface," 1994, Advances in Robot Kinematics, p. 359-368.

Hirota et al., "Development of Surface Display," 1993, IEEE 0-7803-1363-1, pp. 256-262.

Howe et al., "Task Performance with a Dextrous Teleoperated Hand System," 1992, SPIE, vol. 1833, pp. 1-9.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Iwata, Hiroo, "Pen-based Haptic Virtual Environment," Institute of Engineering Mechanics, University of Tsukuba, Japan, pp. 287-292.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kelley et al., "MagicMouse: Tactile and Kinesthetic Feedback in the Human-Computer Interface using an Electromagnetically Actuated Input/Out Device," 1993, University of Brit, Col., p. 1-27.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Millman et al., "Design of a Four Degree-of-Freedom Force-Reflecting Manipulandum with a Specified Force/Torque Workspace," 1991, IEEE CH2969-4, pp. 1488-1492.

Minsky et al., "Feeling & Seeing: Issues in Force Display," 1990, ACM 089791-351-5, pp. 235-270.

Minsky, "Computational Haptics: The Sandpaper System for Synthesizing Texture for a Force-Feedback Display," Ph.D. Dissertation, MIT, Jun. 1995.

Munch et al., "Intelligent Control for Haptic Displays," 1996, Eurographics, vol. 15. No. 3, p. C-217-C-226.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Payatte et al., "Evaluation of a Force Feeback (Haptic) Computer Pointing Device in Zero Gravity," Oct. 17, 1996, ASME Dynamic Systems, vol. 58, p. 547-553.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays; Identification of vibratory intensity, frequency, and contractor area," Journal of The Acoustical Society of America, vol. 82, No. 4, Oct. 1987.

Ramstein et al., "The Pantograph: A Large Workspace Haptic Device for a Multimodal Human-Computer Interaction," 1994, Computer-Human Interaction CHI '94, pp. 1-3.

Ramstein, Combining Haptic & Barille Technologies: Design Issues & Pilot Study, Apr. 11, 1996, ACM Conf. On Asst. Tech., p. 37-44.

Rosenberg et al., "Commercially Viable Force Feedback Controller for Individuals with Neuromotor Disabilities," 1996, Wright Patterson AFB, pp. 1-33.

Rosenberg, L., "The Use of Virtual Fixtures to Enhance Operator Performance in Time Delayed Teleoperation," 1993, Wright-Patterson AFB, pp. 1-45.

Rosenberg, Louis B., "Perceptual Design of a Virtual Rigid Surface Contact," Center for Design Research Stanford University, Air Force Material Command, Apr. 1993, pp. 1-41.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Russo, "The Design and Implementation of a Three Degree-of-Freedom Force Output Joystick," Dept. of Mech. Engineering, 1990, pp. 8-42.

Scannell, "Taking a Joystick Ride," Computer Currents, Boston Edition, vol. 9, No. 11, Nov. 1994.

Schmult et al., "Application Areas for a Force-Feedback Joystick," 1993, Advances in Robotics, Mechatronics, and Haptic Interfaces, vol. 49, pp. 47-54.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Su, S. Augustine et al., "The Virtual Panel Architecture: A 3D Gesture Framework," IEEE 1993, pp. 387-393.

Tadros, "Control System Design for a Three Degree of Freedom Virtual Envronment Simulator Using Motor/Brake Pair Actuators", MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

HAPTIC FEEDBACK EFFECTS FOR CONTROL KNOBS AND OTHER INTERFACE DEVICES

CROSS REFERENCE TO RELATED APPLICATIONS

This application is a continuation of U.S. application Ser. No. 09/783,936, filed Feb. 14, 2001 now U.S. Pat. No. 6,636,197, which is a continuation-in-part of U.S. applications:
application Ser. No. 09/680,408, filed Oct. 2, 2000 now U.S. Pat. No. 6,686,911, which is a continuation of U.S. application Ser. No. 09/179,382, now U.S. Pat. No. 6,154,201, filed Oct. 26, 1998;
application Ser. No. 09/678,110, filed Oct. 2, 2000 now U.S. Pat. No. 6,956,558, which is a continuation of U.S. application Ser. No. 09/049,155, now U.S. Pat. No. 6,128,006, filed Mar. 26, 1998;
application Ser. No. 09/160,985, filed Sep. 24, 1998 now U.S. Pat. No. 6,232,891, which is a continuation of application Ser. No. 08/756,745, now U.S. Pat. No. 5,825,308, filed on Nov. 26, 1996; and this application claims the benefit of U.S. Provisional Application No. 60/182,557, filed Feb. 15, 2000;

all of which are incorporated herein by reference in their entirety.

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

BACKGROUND OF THE INVENTION

This invention relates generally to knob control devices, and more particularly to control knob devices including force feedback and/or additional input functionality.

Control knobs are used for a variety of different functions on many different types of devices. Often, rotary control knobs offer a degree of control to a user that is not matched i11 other forms of control devices, such as button or switch controls. For example, many users prefer to use a rotating control knob to adjust the volume of audio output from a stereo or other sound output device, since the knob allows both fine and coarse adjustment of volume with relative ease, especially compared to button controls. Both rotary and linear (slider) knobs are used on a variety of other types of devices, such as kitchen and other home appliances, video editing/playback devices, remote controls, televisions, computer interface controllers, etc. There are also many types of knobs that allow push-in or pull-out functionality to allow the user additional control over a device.

Some control knobs have been provided with force (kinesthetic) feedback or tactile feedback, which is collectively referred to herein as "haptic feedback." Haptic feedback devices can provide physical sensations to the user manipulating the knob. Typically, a motor is coupled to the knob and is connected to a controller such as a microprocessor. The microprocessor receives knob position and direction signals from the knob sensor and sends appropriate force feedback control signals to the motor so that the motor provides forces on the knob. In this manner, a variety of programmable feel sensations can be output on the knob, such as detents, spring forces, or damping. One problem occurring in control knobs of the prior art is that many of the well known force feedback sensations, such as detents, are applied in simple ways that are often inadequate for dealing with some of the selection functions required from a knob, where often complex control over functions and options must be provided with limited knob motion. For example, selecting options from a menu and navigating between menus can be difficult for a user when only simple detents are output. The user may accidentally skip menus or selections or may have to move a cursor through many undesired selections to reach a desired selection.

SUMMARY OF THE INVENTION

The present invention provides haptic sensations for a rotational haptic feedback device such as a knob. Described haptic sensations take advantage of the limited motion of a rotational device such as a knob and provide greater control over selection and other operations.

More particularly, in one embodiment a method for providing a hill force effect for use with a force feedback device includes outputting a resistive force on a user manipulandum, such as a knob, contacted by a user and moveable in a degree of freedom. The resistive force is output when the user moves the knob in a particular direction toward a division between knob selections or menus. The resistive force is initially low in magnitude and increases in magnitude the further the knob is moved. As the knob is continues to move in the particular direction, the resistive force is removed and an assistive force is output on the knob. The division can be between two menus, for example, each menu having menu items selectable by the knob, said resistive force being output when the user moves between different menus.

In another aspect of the present invention, a method for providing a scrolling list for use with a force feedback device includes causing a display of a menu on a display device, the menu including menu items, where at least one menu item is not displayed concurrently with other menu items. A cursor is displayed for highlighting one of the menu items, which can be selected using a manipulandum. The manipulandum, such as a knob, is moved to a border of the menu, and a spring force is output-resisting motion of the knob out of the menu. A rate control mode is entered when the knob is moved to the border of the menu, where at least one undisplayed menu item is scrolled onto the display device at a rate determined by a distance that the knob is moved past the menu border. A detent force can be output when the cursor moves from one menu item to a different menu item. A jolt or detent output force can be output on the knob when each of the undisplayed items is scrolled onto the display screen.

In another aspect of the present invention, a method for providing a barrier force effect for use with a force feedback device includes sensing motion of a user c manipulandum, determining that a barrier force is to be applied to the manipulandum in a particular direction beginning at a particular position, and outputting the barrier force that resists manipulandum motion in the particular direction. The barrier force increases in magnitude the further that the manipulandum is moved, the magnitude having a lower rate of increase in an initial region and a higher rate of increase past the initial region. For example, the magnitude increase can follow an exponential relationship. An initial oscillating force and/or a damping force can also be applied.

In another aspect of the present invention, a method for providing a jog shuttle control using force feedback includes outputting a first spring force on a rotary knob over an entire range of motion of the knob. The first spring force with a first stiffness biases the knob to an origin position. A second spring force has a second stiffness greater than the first stiffness and the second spring force biases the knob to the origin position. The second spring force is only output on the knob when the knob is in a particular range centered around the origin position. Preferably, a value or function implemented by a microprocessor is changed according to a rate control paradigm, where a rate of the change is determined by a distance of the knob from the origin position.

Other control models for a rotatable knob using haptic feedback are also described. For example, in one control model, a resistive force resists the turning of the knob unless the user moves the knob along the axis of rotation, e.g. the user pushes the knob. The resistive force is then ceased, allowing the user to rotate the knob while the knob has been pushed. In another control model, a first resistive spring force resists a rotation of the knob, and a second resistive force is instead output when the knob reaches a selection point in a direction against the first spring force. The second spring force can have a greater stiffness than the first spring force. A cast control model can provide a first force resisting a rotation of the knob in a first direction. An adjustment of a value or position is made when the user rotates the knob in the first direction to a first position and then rotates the knob in a second direction opposite to the first direction.

The present invention provides a variety of force models and force effects, which are suitable for, use with haptic feedback devices, especially haptic feedback rotary devices such as control knobs. Many of the force effects and models allow a user of a control knob to make selections of menu items, menus, and other options, as well as adjust values, in easier fashion than with control knobs of the prior art. The force effects of the present invention also reduce the amount of overshooting, unintentional selection, and other undesired motions that can occur with prior art haptic and non-haptic control knobs.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
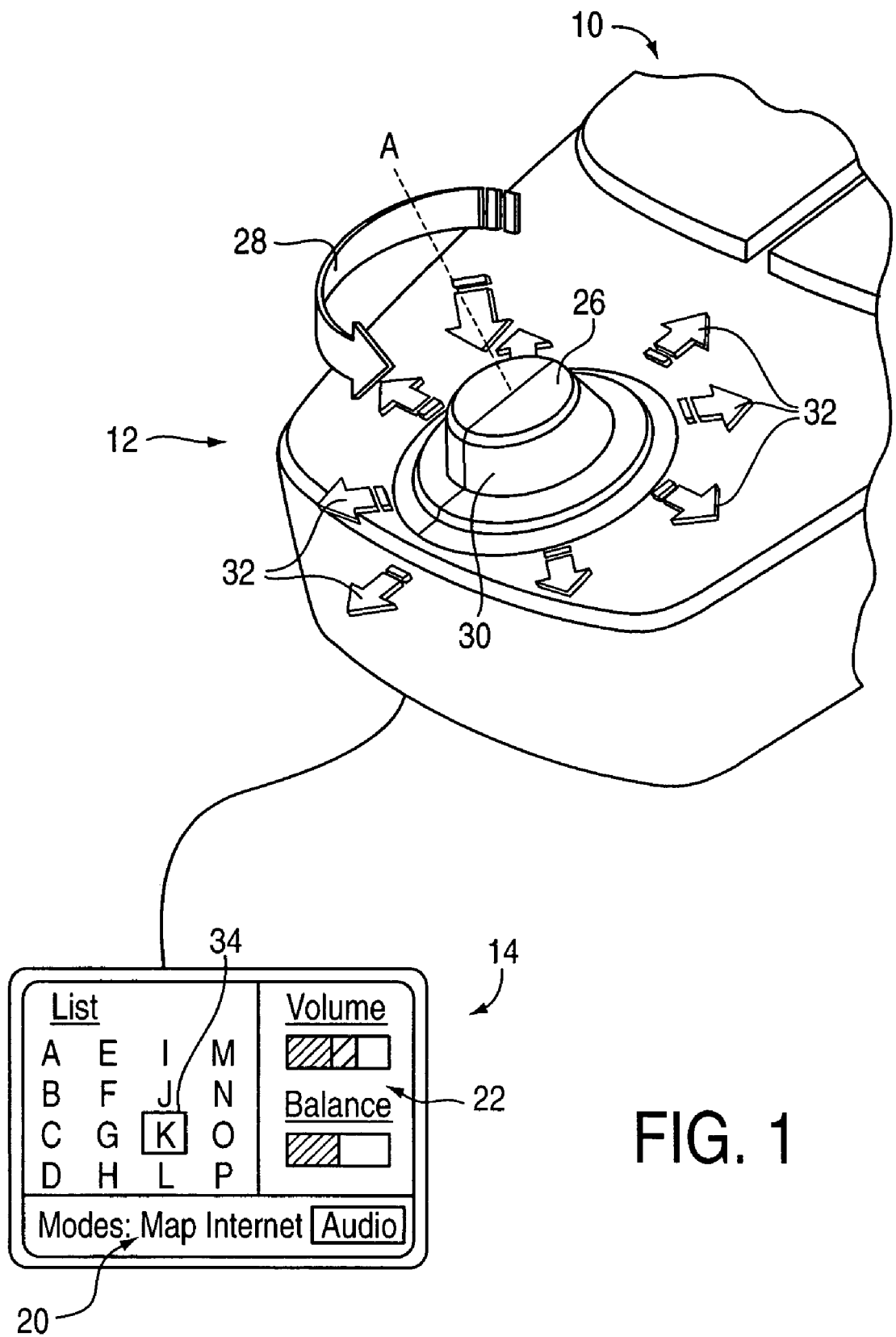
FIG. 1 is a perspective view of one embodiment of a device including a control knob suitable for use with the present invention.

FIG. 1 is a perspective view of an example of a control panel 12 for an electronic device, the control panel including a control knob of the present invention. The control knob is manipulated by the user to control various functions of the device. In the described embodiment, the device is a controller for various automobile systems, e.g., a controller that controls audio output functions from speakers that are connected to the device, environmental functions for the automobile (air conditioning, heat, etc.), mechanical functions for adjusting and moving automobile components (mirrors, seats, sunroof, etc.), visual functions that can be used within the automobile (map display, vehicle status display, menu or list selection, web page display and navigation, etc.), and other functions, such as a security or alarm system for the automobile. For example, a common function of the device is to play sound from one or more media or signals, such as cassette tapes, digital audio transmission (DAT) tapes, compact discs (CD's) or other optical discs, or radio or other signals transmitted through the air from a broadcasting station or wireless network link. The device can include the ability to display information from and/or influence such other systems in a vehicle.

Alternatively, the controlled device can be a variety of other electronic or computer devices. For example, the device can be a home appliance such as a television set, a microwave oven or other kitchen appliances, a washer or dryer, a home stereo component or system, a home computer, personal digital assistant, cellular phone, a set top box for a television, a video game console, a remote control for—any device; a controller or interface device for a personal computer or console games, a home automation system (to control such devices as lights, garage doors, locks, appliances, etc.), a telephone, photocopier, control device for remotely-controlled devices such as model vehicles, toys, a video or film editing or playback system, etc. The device can be physically coupled to the control panel 12, or the panel 12 can be physically remote from the device and communicate with the device using signals transferred through wires, cables, wireless transmitter/receiver, etc. The device can be used in an environment such as a vehicle, home, office, laboratory, arcade, hospital, or other setting.

The control panel 12 is accessible by the user to manipulate the functions of the controlled device. Panel 12 can be mounted, for example, on the interior of a vehicle, such as on or below the dashboard, on the center console of the automobile, or in some other convenient area. Alternatively, the panel 12 can be the surface of the external housing of the controlled device itself, such as a stereo unit.

A display 14 can be coupled to the controlled device and/or panel 12 to show information to the user regarding the controlled device or system and/or other systems connected to the device. For example, options or modes 20 can be displayed to indicate which function(s) of the device are currently selected and being adjusted through manipulation of the knob. Such options can include "audio," "map," "Internet," "telephone," power, etc., and selection of one mode can lead to a menu of sub-modes. Other information 22, such as the current audio volume, audio balance, radio frequency of a radio tuner, etc., can also be displayed. Furthermore, any information related to additional functionality of the device can also be displayed, such as a list 24 of items from which the user can select by manipulating the control panel 12. In some embodiments, a map or similar graphical display can be shown on display 14 to allow the user to navigate the vehicle. In other embodiments, display 14 can be a separate monitor displaying a graphical user interface or other graphical environment as controlled by a host computer. Display 14 can be any suitable display device, such as an LED display, LCD display, gas plasma display, CRT, or other device. In some embodiments, display 14 can include a touch-sensitive surface to allow a user to "touch" displayed images directly on the surface of the display 14 to select those images and an associated setting or function.

Control knob 26 allows the user to directly manipulate functions and settings of the device. Knob 26, in the described embodiment, is approximately a cylindrical object engageable by the user. The knob 26 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface. In addition, any of variety of differently-sized knobs can be provided; for example, if high-magnitude forces are output on the knob, a larger-diameter cylindrical knob is often easier for a user to interface with device. In the described embodiment, knob 26 rotates in a single rotary degree of freedom about an axis extending out of the knob, such as axis A, as shown by arrow 28. The user preferably grips or contacts the circumferential surface 30 of the knob 26 and rotates it a desired amount. Force feedback can be provided in this rotary degree of freedom in some embodiments, as described in greater detail below. Multiple knobs 26 can be provided on panel 12 in alternate embodiments, each knob providing different or similar control functionality.

Furthermore, the control knob 26 of the present invention allows additional control functionality for the user. The knob 26 is preferably able to be moved by the user in one or more directions in a plane approximately perpendicular (orthogonal) to the axis A of rotation ("transverse" or "lateral" motion). Arrows 32 indicate this transverse motion. For example, the knob 26 can be moved in the four orthogonal and four diagonal directions shown, or may be moveable in less or more directions in other embodiments, e.g. only two of the directions shown, etc. In one embodiment, each transverse direction of the knob is spring loaded such that, after being moved in a direction 32 and once the user releases or stops exerting sufficient force on the knob, the knob will move back to its centered rest position. In other embodiments, the knob can be provided without such a spring bias so that the knob 26 stays in any position to which it is moved until the user actively moves it to a new position.

This transverse motion of knob 26 can allow the user to select additional settings or functions of the controlled device. In some embodiments, the additional control options provided by knob 26 allow the number of other buttons and other controls to be reduced, since the functions normally assigned to these buttons can be assigned to the knob 26. For example, the user can move a cursor 34 or other visual indicator on display 14 (e.g. pointer, selection box, arrow, or highlighting of selected text/image) to a desired selection on the display.

Besides such a cursor positioning mode, the transverse motion of knob 26 can also directly control values or magnitudes of settings. For example, the left motion of knob 26 can decrease a radio station frequency value or adjust the volume level, where the value can decrease at a predetermined rate if the user continually holds the knob 26 in the left direction. The right motion of the knob 26 can similarly increase a value. In another example, once one of the information settings is selected, a sub menu can be displayed and the directions 32 of knob 26 can adjust air temperature, a timer, a cursor on a displayed map, etc.

In another implementation, each of eight directions corresponds to a sub-menu category, and each lateral direction is only used for new menu selection, while knob rotation is used for selecting options within the selected menu. For example, categories such as "audio", "map", "temperature" and "cellular phone" can be provided in an automobile context and assigned to the lateral directions. Once the knob is moved in one of the lateral directions, the sub-menu category is selected and, for example, the knob can be rotated to move a cursor through a list, select a function and adjust a value, etc. Other control schemes can also be used. In one embodiment, the knob can travel a small distance laterally from the center position in each of the eight directions. Other travel distances can be implemented in other embodiments.

Different modes can also be implemented; for example, the default mode allows the user to control cursor 34 using the directions 32 of the knob. Once the cursor is located at a desired setting, such as the volume setting, the user can switch the mode to allow the directions 32 to control the setting itself, such as adjusting the value. To switch modes, any suitable control can be used. For example, the user can push the knob 26 to select the mode. In other embodiments, the user can push a separate button to toggle a mode, or some or all of the directions 32 can be used to select modes. For example, the down direction might switch to "volume" mode to allow the user to rotate the knob to adjust volume; the up direction can switch to "adjust radio frequency" mode, and the left direction can switch to "balance" mode (for adjusting the speaker stereo balance for audio output with rotation of knob 26).

In addition, the control knob 26 is preferably able to be pushed (and/or pulled) in a degree of freedom along axis A (or approximately parallel to axis A) and this motion is sensed by an axial switch or sensor. This provides the user with additional ways to select functions or settings without having to remove his or her grip from the knob. For example, in one preferred embodiment, the user can move cursor 34 or other indicator on the display 14 using the transverse directions 32 or rotation of the knob 26; when the cursor has been moved to a desired setting or area on the display, the user can push the knob 26 to select the desired setting, much like a mouse button selects an icon in a graphical user interface of a computer. Or, the push or pull function can be useful to control the modes discussed above, since the user can simply push the knob and rotate or move the knob while it is in the pushed mode, then release or move back the knob to select the other mode. Pushing or pulling the knob 26 can also toggle the modes discussed above. The push and/or pull functionality of the knob 26 can be provided with a spring return bias, so that the knob returns to its rest position after the user releases the knob. Alternatively, the knob can be implemented to remain at a pushed or pulled position until the user actively moves the knob to a new position.

The knob 26 is preferably provided with force feedback in at least the rotary degree of freedom of the knob. One goal of the haptic knob interface described herein is to allow the user to intuitively control several interface modes with a single haptic knob. That is, by adjusting the feel of the knob to clearly correspond to the context of the user interface, users may more easily navigate through complex menus and modes. For example, some interface modes may have the tactile feel of detents; while other modes may have the spring centered feel of a jog-shuttle. By providing familiar haptic metaphors, this variable feedback affords a cleaner, richer user experience.

Additional control buttons (not shown) or other control devices may also be provided on the panel 12 to allow the user to select different functions or settings of the device, including dials, knobs, linear slider knobs, hat switches, etc. Such additional controls may also be used in conjunction with the control knob 26 to provide additional selection and adjustment functionality.

One embodiment of the present invention provides any of the implementations of the haptic knob described herein in conjunction with voice recognition and command functionality. Voice recognition/interpretation software/firmware can run on one or more processors of the device or interface, as is well known to those of skill in the art. Some types of functions can be very well suited for control with a combination of voice and haptic-enhanced touch. For example, a mode, such as audio mode, temperature control mode, etc., can be selected with voice. Then, however, the user can use the haptic knob to adjust a value of a function, such as a radio volume, a temperature setting, etc. This embodiment acknowledges that some selections or adjustments are easier to make with voice, while others are typically easier to make using a manual control. In addition, such an embodiment can optimize control over a device while diverting a user's attention from other tasks, such as driving, by a very small amount.

The sensor used for the knob has two primary purposes: to provide position and direction information (and, in some embodiments, velocity and/or acceleration information) to a local or host processor in order to create realistic haptic effects (for those effects that are position based); and to communicate knob position information to the host computer or processor for selections and manipulation in the host-implemented environment. The haptic effects perform best when a high-resolution sensor is used, e.g. at least 1000 counts per full rotation. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc. In some embodiments, a high-amplification transmission can be used to provide greater resolution, such as a belt drive, capstan drive, etc., as described below with reference to FIG. 2.

Figure 2:
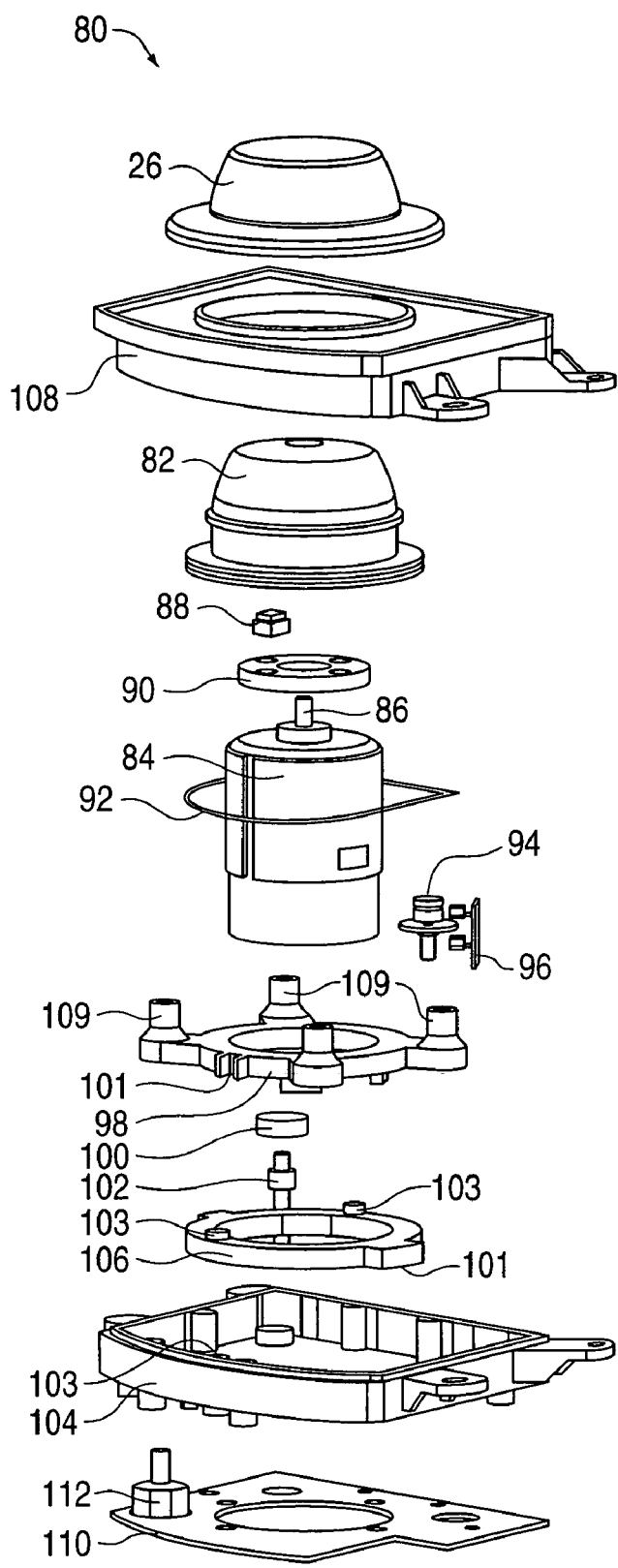
FIG. 2 is a perspective view of one embodiment of a mechanism for implementing the control knob device suitable for use with the present invention.

One example of a knob mechanism that can be used with the present invention is shown with reference to FIG. 2. FIG. 2 is an exploded perspective view of a mechanism 80 for the knob 26. Mechanism 80 implements a direct drive motor for reduced friction and higher fidelity.

Knob 26 that is contacted by the user is directly coupled to a knob pulley 82, which is in turn directly coupled to a rotating shaft 86 of an actuator 84, such as a DC motor or other type of actuator. A select switch 88 is provided in a switch bracket 90 provided between knob pulley 82 and motor 84; the pulley 82 closes the select switch 88 when the user pushes on the knob and moves it linearly along the axis of rotation so that the controlled device can detect when the knob is pushed. The select switch 88 preferably provides a spring centering force on the axial motion of the knob.

An encoder drive belt 92 is coupled to the knob pulley and drives an encoder pulley disk 94, which is rotated between an emitter and detector on a grounded encoder printed circuit board (PCB) assembly 96. A top slider 98 is positioned around the housing of actuator 84 and includes a gate 100 facing down, which is mated with a plunger 102. The plunger 102 is preferably spring loaded in an aperture in the bottom case 104, and a bottom slider 106 is positioned between the bottom case 104 and the top slider 98. The bottom slider 106 and top slider 98 slide transversely with respect to each other to allow the knob 26 and actuator 84 to together be moved in eight lateral directions (perpendicular to the axis of rotation of the knob). The engagement of slots 101 and keys 103 in the slider members and in the bottom case 104 allow this transverse motion, where the slots and keys permit transverse motion. The plunger 102 and gate 100 interaction also confines the knob to desired lateral directions, since the gate 100 is preferably grooved in the desired directions, confining the plunger 102 to those directions.

The plunger 102 and gate 100 are offset from the center axis of rotation of the mechanism. In some embodiments, the offset nature of these components can introduce some rotational play of the knob about the center of the gate. In such embodiments, it is preferred that a second gate and spring-loaded plunger 105 be provided on the opposite side of the sliders 98 and 106 to the existing gate and plunger to provide greater stability and less play and vibration in the mechanism. In a preferred embodiment, only one of the gates includes grooves for guiding purposes; the other gate can have a smooth, concave or cone-shaped underside.

A top case 108 can be positioned wider the knob 26 and can be coupled to the bottom case 104 to provide a housing around much of the mechanism. In a preferred embodiment, the top slider 98 includes rounded surfaces on projecting members 109, where the rounded surfaces contact the underside of top case 108 to provide stability for the sliding lateral motion of the knob mechanism.

A main PCB assembly 110 can be used to hold circuitry and other needed electronic components for the mechanism 80. In addition, a lateral sensor for sensing the motion of the knob in the eight lateral directions can take the form of a compact stick controller 112. Controller 112 includes a base that is coupled to the grounded PCB assembly 110 and a stick portion that extends into a receptacle in the top slider 98. As the top slider 98 moves in the eight lateral directions, the stick of the controller 112 moves in corresponding directions and a sensor within the controller 112 senses this motion. In other embodiments, other types of sensors can be used for lateral sensors, such as optical beam sensors, contact switches or sensors, Hall effect sensors, optical encoders, etc.

It should be noted that the embodiment described above is not the only embodiment that can be used with the present invention. For example, some embodiments may only include the transverse motion of knob 26 and not the push and/or pull functionality nor the force feedback functionality. Yet other embodiments may only include force feedback with transverse knob motion, or force feedback with push and/or pull functions. Other embodiments may employ other user manipulandums, such as joysticks, mice, trackballs, steering wheels, grips, etc.

The above embodiment and other suitable embodiments for the present invention are described in greater detail in copending patent application Ser. No. 09/637,513, filed Aug. 11, 2000, which is incorporated herein by reference in its entirety.

Figure 3:
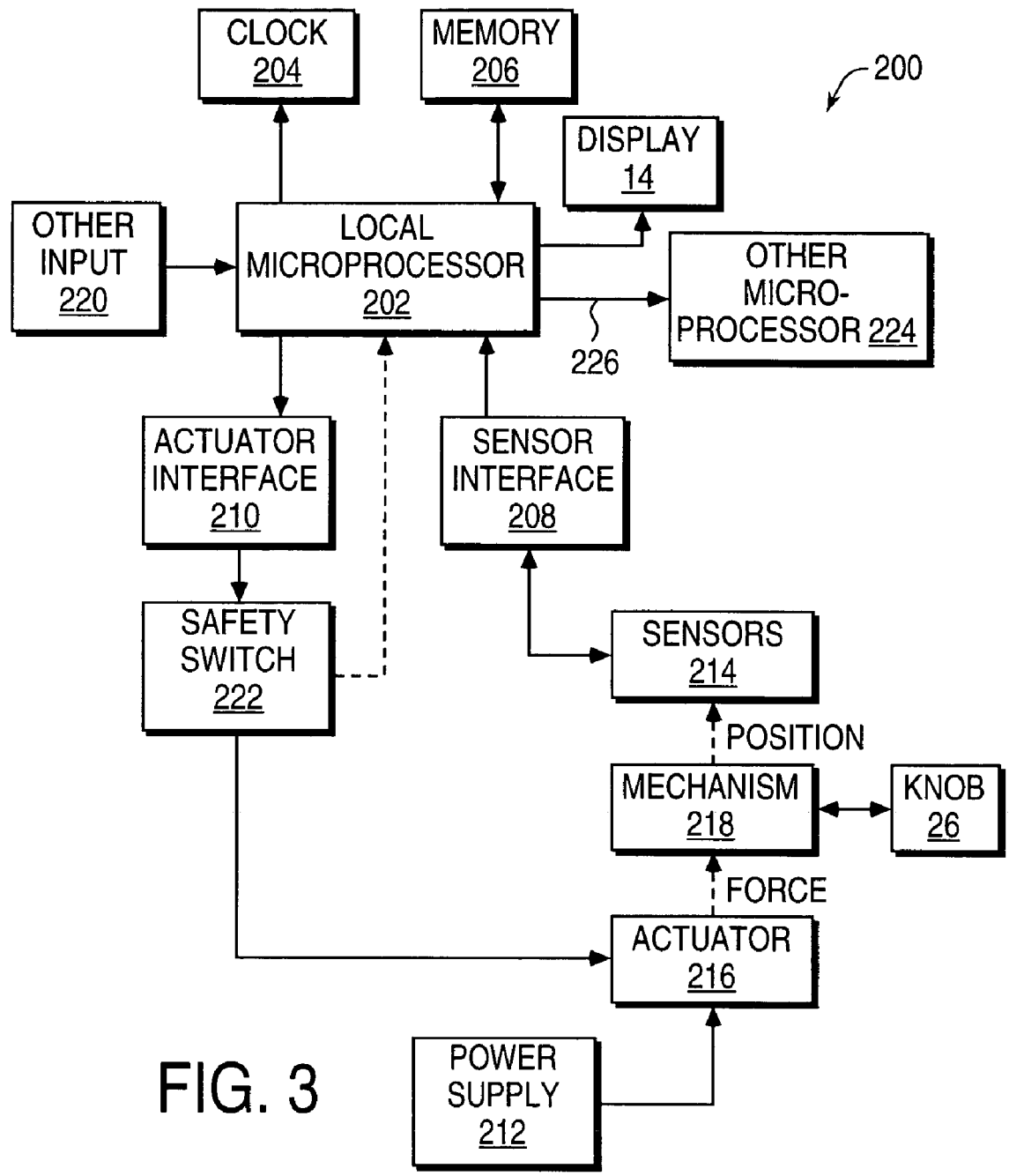
FIG. 3 is a block diagram of a control system suitable for use with the control device of FIGS. 1 and 2.

FIG. 3 is a block diagram illustrating an electromechanical system 200 suitable for use with the device controlled by a knob of the present invention. A haptic feedback system including many of the below components is described in detail in U.S. Pat. No. 5,734,373, which is incorporated by reference herein in its entirety.

In one embodiment, the controlled device includes an electronic portion having a local microprocessor 202, local clock 204, local memory 206, sensor interface 208, and actuator interface 210.

Local microprocessor 202 is considered "local" to the device, where "local" herein refers to processor 202 being a separate microprocessor from any other microprocessors, such as in a controlling host computer (see below), and refers to processor 202 being dedicated to force feedback and/or sensor I/O for the knob 26. In force feedback embodiments, the microprocessor 202 reads sensor signals and can calculate appropriate forces from those sensor signals, time signals, and force processes selected in accordance with a host command, and output appropriate control signals to the actuator. Suitable microprocessors for use as local microprocessor 202 include the 8X930AX by Intel, the MC68HC711E9 by Motorola and the PIC16C74 by Microchip, for example. Microprocessor 202 can include one microprocessor chip, or multiple processors and/or co-processor chips, and can include digital signal processor (DSP) functionality. Microprocessor 202 can also include "haptic accelerator" chips dedicated to calculating velocity, acceleration, and/or other force-related data. Or, the processor 202 can be fixed digital logic, an ASIC, state machine, or other type of controller.

A local clock 204 can be coupled to the microprocessor 202 to provide timing data, for example, to compute forces to be output by actuator 216. Local memory 206, such as RAM and/or ROM, is preferably coupled to microprocessor 202 to store instructions for microprocessor 202, temporary and other data, calibration parameters, adjustments to compensate for sensor variations can be included, and/or the state of the device. Display 14 can be coupled to local microprocessor 202 in some embodiments. Alternatively, a different microprocessor or other controller can control output to the display 14.

Sensor interface 208 may optionally be included in to convert sensor signals to signals that can be interpreted by the microprocessor 202. For example, sensor interface 408 can receive signals from a digital sensor such as an encoder and convert the signals into a digital binary number. An analog to digital converter (ADC) can also be used. Alternately, microprocessor 202 can perform these interface functions. Actuator interface 210 can be optionally connected between the actuator and microprocessor 402 to convert signals from microprocessor 202 into signals appropriate to drive the actuators. Actuator interface 210 can include power amplifiers, switches, digital to analog controllers (DACs), and other components. In alternate embodiments, actuator interface 210 circuitry can be provided within microprocessor 202 or in the actuator(s).

A power supply 212 can be coupled to the actuator and/or actuator interface 210 to provide electrical power. In a different embodiment, power can be supplied to the actuator 216 and any other components (as required) by an interface bus. Power can also be stored and regulated by the device and thus used when needed to drive the actuator.

The mechanical portion of the system can include some or all of the components needed for rotational motion of knob 26, transverse motion of knob 26, the push and/or pull motion of knob 26, and haptic feedback in any or all of these degrees of freedom of the knob, as described above. Sensors 214 sense the position, motion, and/or other characteristics of knob 26 along one or more degrees of freedom and provide signals to microprocessor 202 including information representative of those characteristics. Typically, a sensor 214 is provided for each degree of freedom along which knob 26 can be moved, or, a single compound sensor can be used for multiple degrees of freedom. Examples of suitable sensors include optical encoders, analog sensors such as potentiometers, Hall effect magnetic sensors, optical sensors such as a lateral effect photo diodes, tachometers, and accelerometers. Furthermore, both absolute and relative sensors may be used.

In those embodiments including force feedback, actuator 216 transmits forces to knob 26 in one or more directions in a rotary degree of freedom in response to signals output by microprocessor 202 or other electronic logic or device, i.e., it is "electronically controlled." The actuator 216 produces electronically modulated forces, which means that microprocessor 202, or other electronic device controls the application of the forces. Typically, an actuator 216 is provided for each knob 26 that includes force feedback functionality. In some embodiments, additional actuators can also be provided for the other degrees of freedom of knob 26, such as the transverse motion of the knob 26 and/or the push or pull motion of the knob. Actuator 216, can be an active actuators, such as a linear current control motor, stepper motor, pneumatic/hydraulic active actuator, a torquer (motor with limited angular range), voice coil actuator, etc. Passive actuators can also be used, including magnetic particle brakes, friction brakes, or pneumatic/hydraulic passive actuators, and generate a damping resistance or friction in a degree of motion.

Mechanism 218 is used to translate motion of knob 26 to a form that can be read by sensors 214, and, in those embodiments including force feedback, to transmit forces from actuator 216 to knob 26. Examples of mechanism 218 are shown above. Also, a drive mechanism such as a belt drive, gear drive, or capstan drive mechanism can be used to provide mechanical advantage to the forces output by actuator 216.

Other input devices 220 can be included to send input signals to microprocessor 202. Such input devices can include buttons or other controls used to supplement the input from the panel to the controlled device. Also, dials, switches, voice recognition hardware (e.g. a microphone, with software implemented by microprocessor 202), or other input mechanisms can also be included to provide input to microprocessor 202 or to the actuator 216. A deadman switch can be included on or near the knob to cause forces to cease outputting when the user is not contacting the knob as desired to prevent the knob from spinning on its own when the user is not touching it, e.g. contact of a user's digit (finger, thumb, etc.) with the knob can be detected, pressure on the knob 26 from the user can be detected.

Other microprocessor 224 can be included in some embodiments to communicate with local microprocessor 202. Microprocessors 202 and 224 are preferably coupled together by a bi-directional bus 226. Additional electronic components may also be included for communicating via standard protocols on bus 226. These components can be included in the device or another connected device. Bus 226 can be any of a variety of different communication busses. For example, a bi-directional serial or parallel bus, a wireless link, a network architecture (such as CANbus), or a unidirectional bus can be provided between microprocessors 224 and 202.

Other microprocessor 224 can be a separate microprocessor in a different device or system that coordinates operations or functions with the controlled device. For example, other microprocessor 224 can be provided in a separate control subsystem in a vehicle or house, where the other microprocessor controls the temperature system in the car or house, or the position of mechanical components (car mirrors, seats, garage door, etc.), or a central display device that displays information from various systems. Or, the other microprocessor 224 can be a host microprocessor or centralized controller for many systems including the controlled device. The two microprocessors 202 and 224 can exchange information as needed to facilitate control of various systems, output event notifications to the user, etc. For example, if other microprocessor 224 has determined that the vehicle is overheating, the other microprocessor 224 can communicate this information to the local microprocessor 202, which then can output a particular indicator on display 14 to warn the user. Or, if the knob 26 is allowed different modes of control, the other microprocessor 224 can control a different mode. Thus, if the knob 26 is able to control both audio stereo output as well as perform temperature control, the local microprocessor 202 call handle audio functions but can pass all knob sensor data to other microprocessor 224 to control temperature system adjustments when the device is in temperature control mode.

In other embodiments, other microprocessor 224 can be a host microprocessor, for example, that commands the local microprocessor 202 to output force sensations by sending host commands to the local microprocessor. The host microprocessor can be a single processor or be provided in a computer such as a personal computer, workstation, video game console, portable computer or other computing or display device, set top box, "network-computer", etc. Besides microprocessor 224, the host computer can include random access memory (RAM), read only memory (ROM), input/output (I/O) circuitry, and other components of computers well-known to those skilled in the art. The host processor can implement a host application program with which a user interacts using knob 26 and/or other controls and peripherals. The host application program can be responsive to signals from knob 26 such as the transverse motion of the knob, the push or pull motion, and the rotation of the knob (e.g., the knob 26 can be provided on a game controller or interface device such as a game pad, joystick, steering wheel, or mouse that is connected to the host computer). In force feedback embodiments, the host application program can output force feedback commands to the local microprocessor 202 and to the knob 26. In a host processor embodiment or other similar embodiment, microprocessor 202 can be provided with software instructions to wait for commands or requests from the host processor, parse/decode the command or request, and handle/control input and output signals according to the command or request.

For example, in one force feedback embodiment, host microprocessor 224 can provide low-level force commands over bus 226, which microprocessor 202 directly transmits to the actuators. In a different force feedback local control embodiment, host microprocessor 224 provides high level supervisory commands to microprocessor 202 over bus 226, and microprocessor 202 manages low level force control loops to sensors and actuators in accordance with the high level commands and independently of the host computer. In the local control embodiment, the microprocessor 202 can independently process sensor signals to determine appropriate output actuator signals by following the instructions of a "force process" that may be stored in local memory 206 and includes calculation instructions, formulas, force magnitudes (force profiles), and/or other data. The force process can command distinct force sensations, such as vibrations, textures, jolts, or even simulated interactions between displayed objects. Such operation of local microprocessor in force feedback applications is described in greater detail in U.S. Pat. No. 5,734,373.

In an alternate embodiment, no local microprocessor 202 is included in the interface device, and a remote microprocessor, such as microprocessor 224, controls and processes all signals to and from the components of the interface device. Or, hardwired digital logic can perform any input/output functions to the knob 26.

Force Sensations for Rotational Devices

A number of force sensations are now described which are suitable for use with rotational force feedback devices. For example, these force sensations can be used with rotational manipulandums such as knobs, steering wheels, or rotary scroll wheels on mice. Where applicable, these force sensations can also be used in with other types of devices and/or in non-rotational contexts, e.g. a joystick, mouse, linear-moving knob, etc.

A preferred implementation for controlling force sensations utilizes a host controller, such as a host microprocessor, and a local processor, such as a microprocessor, as described above. The host microprocessor can implement the environment, application, and/or the device functions with which the user is interacting, such as a displayed interface menu, the operation of controlled functions, etc. The host microprocessor can send high-level commands to the local microprocessor to output a particular force effect. The local microprocessor can access local memory and implement a force effect independently of the host processor once the command has been given. The host can issue a command to stop the effect at a later time, if necessary (or the original command can include a duration parameter or the like). Alternatively, the host processor can control force output from the actuator(s) directly by sending force values to the actuator (a local microprocessor, if present, and/or other interface components can convert the values to signals usable by the actuator).

Force Effects

Force effects provide individual force sensations to a user. Force effects can be combined in various ways with functional behavior to provide a force model or "machine," which is described below. In one preferred implementation, the local microprocessor implements force effects after receiving one or more high level commands from the host processor, as explained above. A command can include a command identifier and one or more (or zero) effect parameters that characterize a force effect.

For example, the host can define a force effect and organize the effect parameters into serial packets. Once the effect is received by the local microprocessor and the local microprocessor is commanded to start output, the local processor is entirely responsible for playing the effect. Meanwhile, the host processor can acquire position information of the knob from the local processor, or query the status of the local processor's effect output. In one embodiment, the host processor can keep track of the local processor's memory to determine how to manage local effect storage. For example, the local memory may only be able to hold eight effects at once, requiring the host processor 'to manage when to send new effects or instruct the deletion of previously-sent effects. Aspects of such memory management are described in copending application Ser. No. 09/305,872, incorporated herein by reference in its entirety.

Available force effects can include springs, dampers, textures, vibrations, detents, jolts or pulses, textures, inertia, friction, obstructions (barriers), or dynamic force effects. Many of these effects are described in other applications, such as applications No. 60/149,781 and 60/159,930 and U.S. Pat. Nos. 5,734,373; 6,147,674; 6,154,201; and 6,128, 006, all incorporated herein by reference in their entirety. These sensations can also enable or aid particular control schemes for an electronic device, such as isometric and isotonic control modes, as described in the incorporated applications and patents. The force sensations can be integrally implemented with the control functions performed by the knob.

A basic force sensation is force detents that are output at particular predefined or regularly-spaced rotational positions of the knob to inform the user how much the knob has rotated and/or to designate a particular position of the knob. The force detents can be simple jolts or bump forces to indicate the detent's position, or the detents can include forces that attract the knob to the particular rotational detent position and/or resist movement of the knob away from that position. For example, a force profile showing a line upwardly sloped and crossing through the origin is a standard detent. This and other types of detents are described in U.S. Pat. No. 6,154,201. Force feedback "snap-to" detents can also be provided, where a small force biases the knob to the detent position when it is just outside the position. Also, the magnitude of the force deternts car, differ based on the value being controlled. In some embodiments, the user can also change the magnitude of force detents associated with particular values or actions. Also, different sets of detent force profiles can be stored in a memory device on the device and a particular set can be provided on the knob 26 by a microprocessor or other controller in the device.

Another type of force sensation that can be output on knob 26 is a spring force. The spring force can provide resistance to rotational movement of the knob in either direction to simulate a physical spring on the knob. This can be used, for example, to "snap back" the knob to its rest or center position after the user lets go of the knob, e.g. once the knob is rotated pasta particular position, a function is selected, and the user releases the knob to let the knob move back to its origin position. A damping force sensation can also be provided on knob 26 to slow down the rotation of the knob, allowing more accurate control by the user. Furthermore, any of these force sensations can be combined together for a single knob 26 to provide multiple simultaneous force effects.

The spring return force provided in the rotary degree of freedom of the knob 26 can also be used to implement a rate control paradigm. "Rate control" is the control of a rate of a function, object, or setting based on the displacement of the knob 26 from a designated origin position. The further the knob is moved away from the origin position, the greater the rate of change of controlled input. For example, if a rate control knob 26 with a spring return force is used to control a radio frequency, then the further the knob is moved from the center origin position, the faster the radio frequency will change in the appropriate direction. The frequency stops changing when the knob is returned to the origin position. The spring force is provided so that the further the user moves the knob away from the origin position, the greater the force on the knob in the direction toward the origin position. This feels to the user as if he or she is inputting pressure or force against the spring rather than rotation or displacement, where the magnitude of pressure dictates the magnitude of the rate. However, the amount of rotation of the knob is actually measured and corresponds to the pressure the user is applying against the spring force. The displacement is thus used as an indication of input force.

This rate control paradigm differs from "position control", where the input is directly correlated to the position of the knob in the rotary degree of freedom. When providing position control, in the radio frequency example, if the user moves the knob to a particular position, the radio frequency is set to a particular value corresponding to that rotary position of the knob and does not change further. Force detents are more appropriate for such a paradigm. In contrast, in the rate control example, moving the knob to a particular position causes the radio frequency to continue changing at a rate designated by the position of the knob.

A single knob 26 can provide both rate control and position control over functions or graphical objects in different modes. One example of a force feedback device providing both rate control (isometric input) and position control (isotonic input) is described in greater detail in U.S. Pat. No. 5,825,308, incorporated herein by reference. Such rate control and position control can be provided in the rotary degree of freedom of the knob 26. Also, if knob 26 is provided with force feedback in the transverse degrees of freedom or in the push/pull linear degree of freedom, then the rate control and position control modes can be provided in those degrees of freedom.

In haptic knob implementations, when determining the desired force levels to be output on the knob 26, the strength of the stiffest haptic effect should be referenced. Given that the specific force levels vary with every effect, it has been assumed that a barrier effect (end stopping force in the rotation of the knob) will require the highest sustained torque levels. One method, which can be used, is to provide a momentary force level above the highest level that can be maintained, as described below with reference to the barrier force effect.

The actuator used is preferably designed to provide maximum torque while taking into consideration the voltage and current limitations of the power electronics and amplifiers driving the actuator. Often, strictly adhering to a minimum torque requirement may result in an "over-designed" knob; although it play be desirable to maximize torque to simulate stiff barriers, most effects can be communicated with much less torque. An intermediate torque level that represents a reasonable compromise of the various conflicting constraints of size, weight, torque and friction is often adequate for realistic force feedback.

Other Force Effects

Figure 4A:
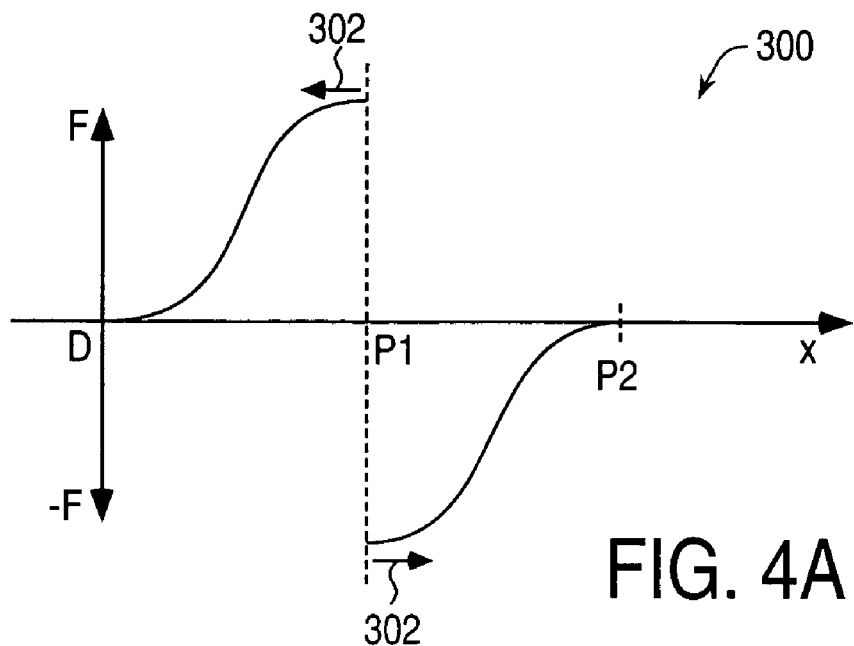
FIGS. 4a, 4b, 4c and 4d are graphs illustrating different embodiments of hill force effect profiles.

Hill Force Effect: One force effect that is suitable for rotational devices is a "hill" effect. One example of a hill force profile 300 is shown in FIG. 4a, where the horizontal axis represents the position of the knob (or other manipulandum) and the vertical axis represents the force magnitude on the knob in the rotary degree of freedom. The force direction is indicated by the curve's position above or below the horizontal axis, and is also indicated by arrows 302. Thus, when the knob is moved from a origin position O to a position P1, a resistive force on the knob towards the origin O gets progressively stronger the further from the origin the knob is rotated. Preferably, the magnitude roughly follows an S-shaped curve as shown, but can be provided in other shapes in other embodiments. However, once the knob is past the position P1 (the selection point or division between menus or other items), the force changes direction to bias the movement of the knob towards the position P2, i.e. an assistive force. The force magnitude decreases the further the knob is moved toward the position P2; preferably, the assistive force also roughly follows an S-shaped curve, but can be provided in other shapes in other embodiments. Similarly, if the knob is moved in the opposite direction, represented as right to left, a resistive force from P2 to P1 is output, which switches to an assistive force once the knob is moved past P1 toward origin O. Preferably, a selection or switching of options or menus is implemented once the selection point P1 is reached by the knob.

Figure 4B:
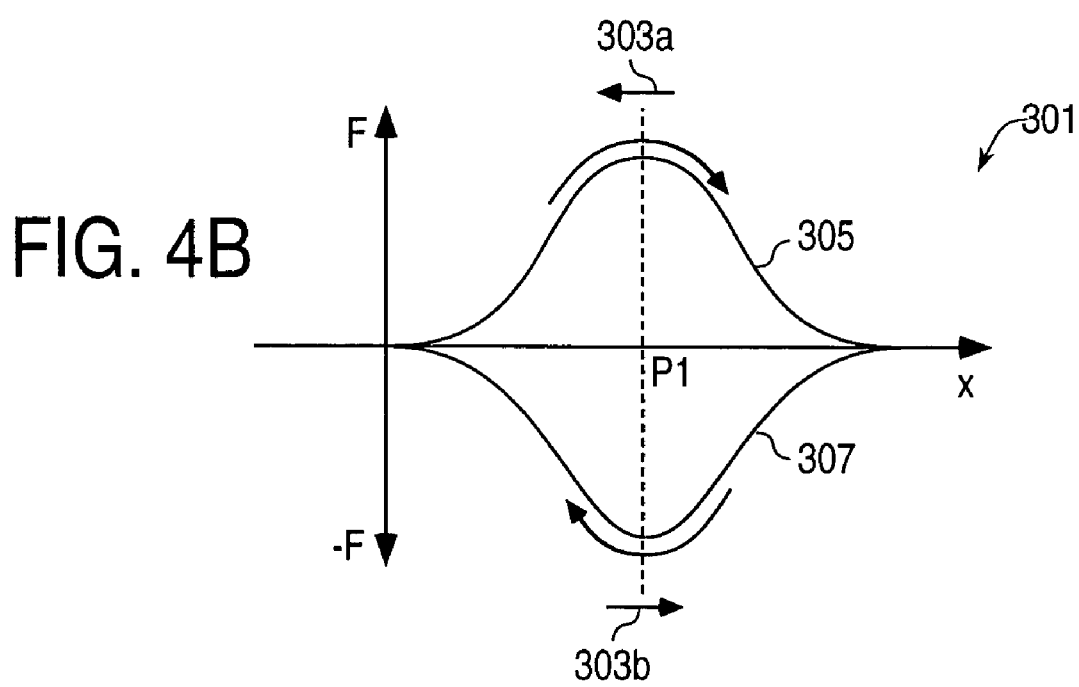

A different example of a hill force effect is shown in the force profile 301 of FIG. 4*b*. In this diagram, the force that is output always resists motion of the knob. If the knob is moved in a first direction, represented as motion left to right in the force profile, then a resistive force is output, indicated by curve 305 and arrow 303*a*, which resists motion of the knob in that direction. The magnitude of the resistive force slopes up to a peak, then slopes back down. The sloping down of the resistive force allows the user to ease the knob through the remaining hill force and, for example, into the next menu. Similarly, a resistive force shown by curve 307 and arrow 303*b* is provided when the user moves the knob in an opposite direction, represented as right-to-left in the profile 301. The resistive force slopes to a peak and then back down, similarly to the curve 305.

Figure 4C:
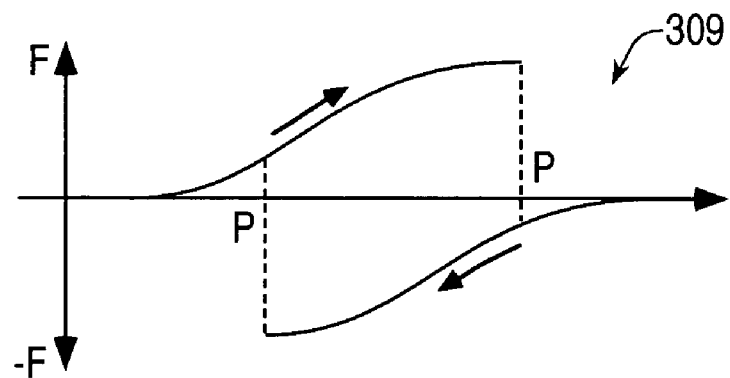

Another example of a hill force effect is shown in FIG. 4*c*. In this profile 309, the hill force curves are overlapped; only one of the curves is in effect at any one time, depending on the direction of the knob. If the knob is moved from left to right, an increasing resistive force is output, shown by the upper curve. When the knob is moved to an endpoint P, the force becomes assistive, as shown by the remainder of the lower curve to the right of point P. However, the assistive force at point P is not at as high a magnitude as the resistive force was, allowing a more gradual motion towards the right. A similar resistive and assistive force is provided in moving the knob in the opposite direction. This is in contrast to the profile of FIG. 4*a*, in which, the assistive force at point PI is at the same magnitude as the former resistive force; in some embodiments, this can cause the user to unintentionally move the knob farther than intended due to the change over to a high magnitude assistive force. The profile of FIG. 4*c* avoids some of these problems.

Figure 4D:
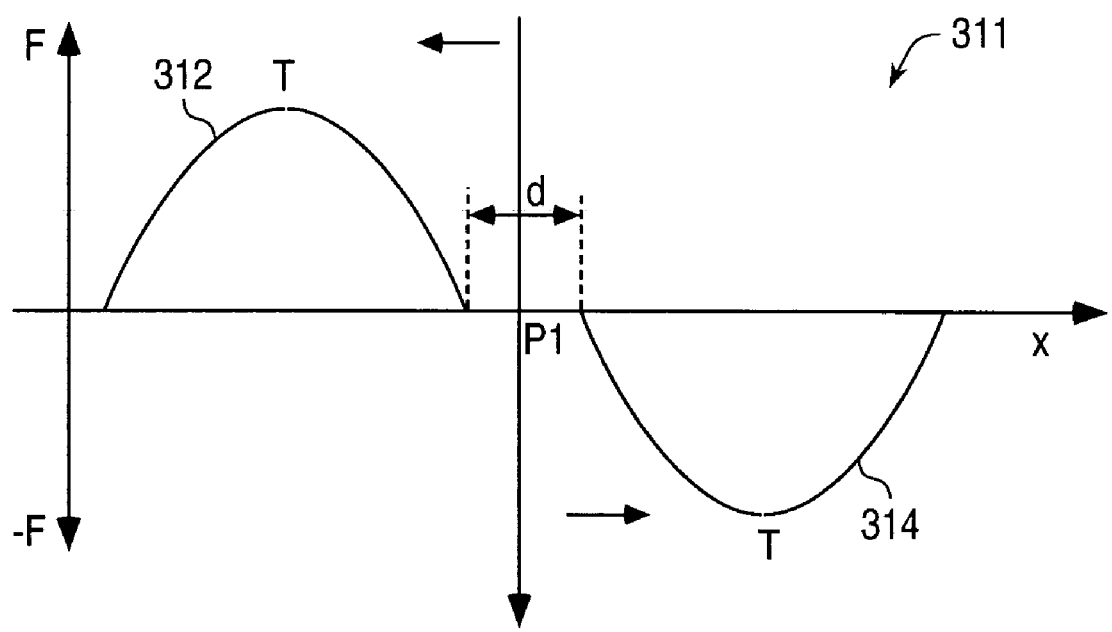

Yet another example of a hill force effect is shown in FIG. 4*d*. In this profile, the knob can be moved toward position P1 from either side. Before reaching position PI, the knob experiences an increasing resistive force represented by curve 312 or 314. After the knob reaches the peak point T at either side, the resistance force reduces in magnitude until it reaches zero at or just before the selection or division position P1. If the knob is continues to move past the position P1, it experiences an assistive force that increases to point T and then reduces to zero. This profile thus provides a stable point at position PI if the knob is halted at the position P1; some embodiments can provide a greater dead zone shown as distance d if a larger stable zone is desired. The effect biases the knob to move into the next selection once point P1 is passed.

Figure 4E:
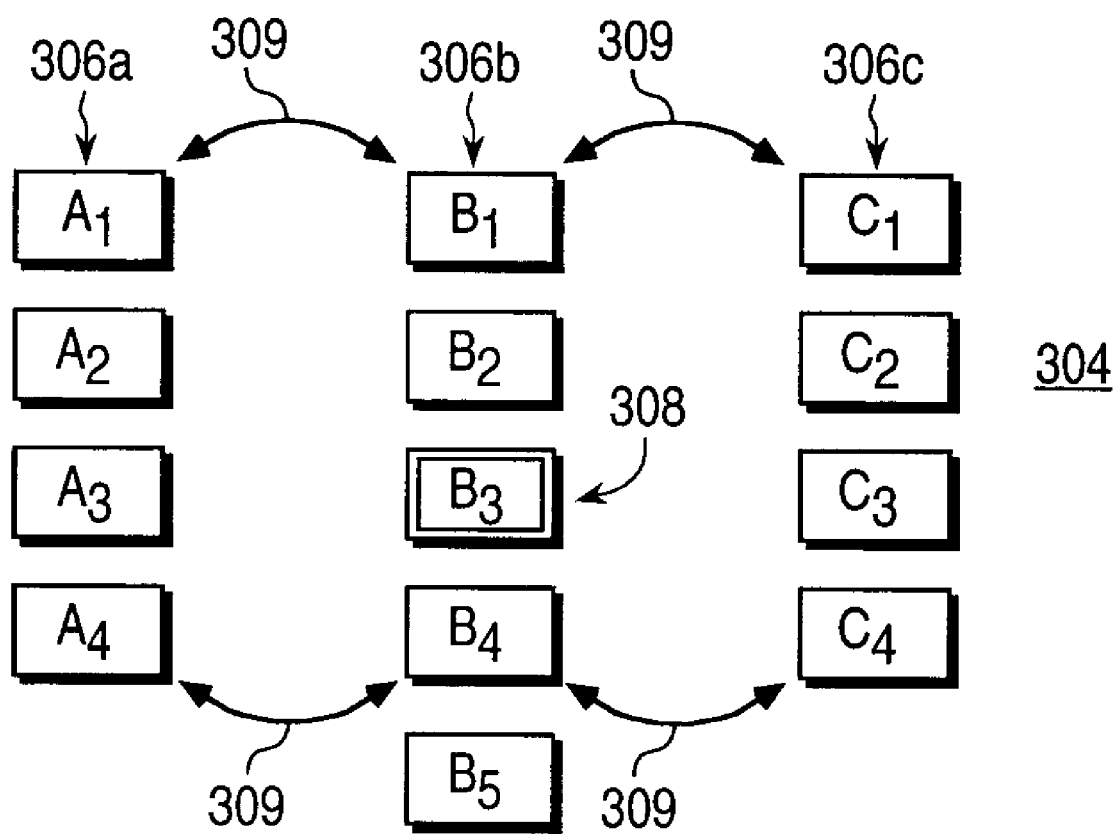
FIG. 4e is a diagrammatic illustration of multiple menus or lists and the movement between menus.

The hill force effect can be useful in several contexts. In basic operation, the hill effect can be used to haptically indicate divisions between screens, objects, menus, menu items, values, device functions, or other types of selections, and reduce undesired selection or movement between those selections. One example is shown in FIG. 4*e*. A display screen 304 might display multiple different menus or lists 306, each menu having several items. For example, menu 306*a* includes items A1-A4, menu 306*b* includes items B1-B5, and menu 306*c* includes items C1-C4. Moving the knob, e.g. clockwise to move down the list, counterclockwise to move up the list, can move a selection cursor 308 to different items. The cursor can be moved to a different menu when the user continues to rotate the knob past the last item (or first item) in a menu. For example, when moving the cursor past item B5, the cursor will move to item C4 in menu 306*c* (or to item C1 in other embodiments). If the cursor is moved to a position before item B1, the cursor moves to item A1 (or to item A4 in other embodiments). Moving the cursor past item C4 can move the cursor to item A4 (or A1), and so on.

When selecting an item within a single menu, standard detent force effects can be output between menu items to ease the selection of individual menu items, such as those overlapping detent effects described in U.S. Pat. No. 6,154, 201. For example, each successive item in a linear menu 306 can be provided with a detent, where the detent force profile overlaps with the beginning of the next item's detent force profile as a way to provide a more compelling feel to the user and, in some cases, to reduce selection overshoot. The visual aspect of selection can also be correlated with the overlapping detent forces. For example, the displayed cursor 308 is preferably not moved to an adjacent menu item until the knob reaches the end of the current force detent profile, regardless of whether the precise border position between menu items has already been passed by the knob.

When moving from one whole menu 306 to the next menu 306, a hill force effect can be output to indicate haptically to the user that whole menus or lists are being switched. The cursor can be moved to the next menu when the selection point (P1) is reached by the knob. For example, the hill force effect can be of much stronger magnitude than the menu detents and require a significant amount of force to move the knob "over" the hill, so that the user will not accidentally switch menus by moving to a border item in the menu unless he or she really intends to switch. Alternatively (or additionally), the hill effect can be made much "wider," i.e. cover a greater range of rotation of the knob, than the menu detents to indicate its menu switching function. If more than two menus are provided in succession, a hill force effect can separate each of the successive menus. Thus, the hill force effect can be provided as indicated by arrows 309.

The hill force effect can be implemented in many ways. In one embodiment, a detent force profile (e.g., the portion of the profile to the left of position P1 in FIG. 4*a*) can be phase-shifted to the desired location to provide a hill. Preferably, a local microprocessor, in communication with a host microprocessor, can both locally calculate and control the force effects as well as gate the effects, i.e. determine when the force effect is to be applied and when it is to be turned off, based on information such as time (duration) and/or device position. Alternatively, the host processor can gate the hill effect and/or implement the hill effect.

Barrier Force Effect: A barrier effect is preferably one of the highest-magnitude effects available since its purpose is to convey to the user that the knob has reached a limit to its motion.

Figure 5A:
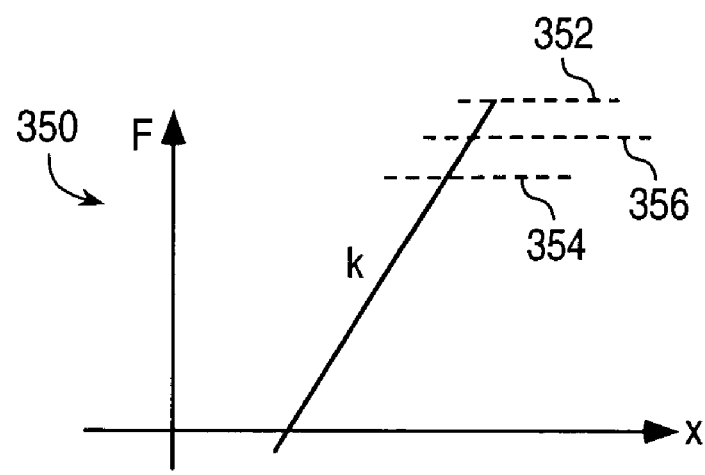
FIG. 5a is a graph illustrating a linear barrier force effect.

One way to implement a barrier effect is to provide a simple spring force having a high magnitude or "stiffness." A spring of the prior art is typically modeled using a relationship such as F=kx, where the resistive force output is linearly proportional to the distance that the knob is moved into the spring. An example of a force profile 350 for such a linear spring is shown in FIG. 5*a*. However, this type of linear spring can present problems i11 some applications. For example, springs that have a high slope (large k value) increase the force level to a large extent in a relatively short amount of knob motion. Barrier forces are often represented using such springs of high stiffness. However, instability can develop when the knob is first moved into the barrier force. The high magnitude can be very sudden and may cause the knob to back up slightly away from the barrier. This tends to move the knob completely out of the barrier, so that when the user again moves the knob into the barrier, the same events occur, causing a repeating unstable shaking or vibration of the knob in and out of the barrier force. This tends to happen only at low force magnitudes since the user is only applying a small amount of force to the knob at those outputs, e.g. a light grip. As the user pushes the knob further into the barrier, the user must apply more force and is thus "stiffer" and the motion more stable.

Figure 5B:
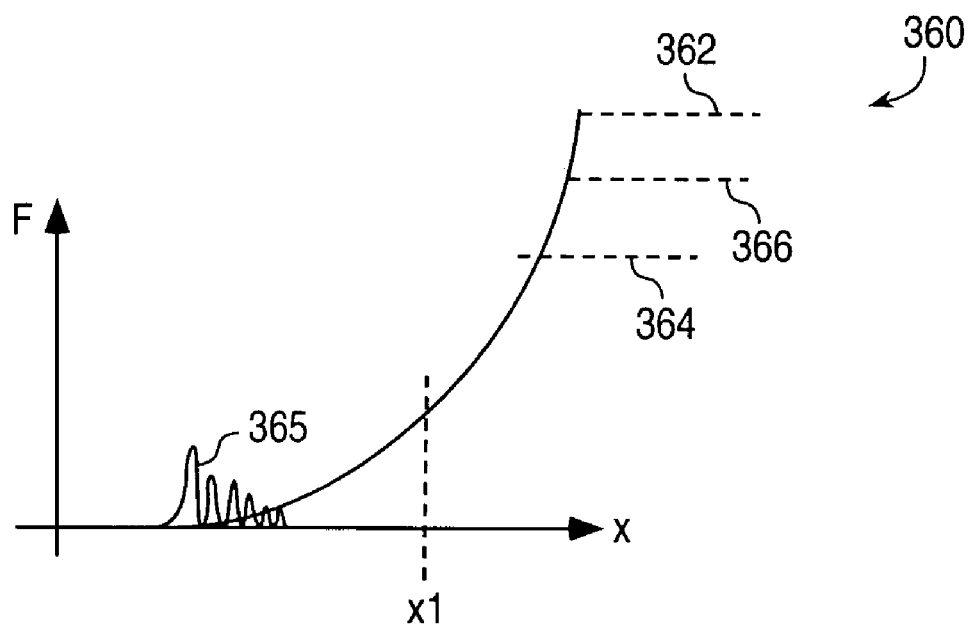
FIG. 5b is a graph illustrating a non-linear barrier force effect of the present invention.

The present invention solves this problem by gradually and slowly increasing the resistive force in the first, low-magnitude section or region of the barrier force, and then increasing the barrier force at a greater rate in the deeper distances. One way to provide this type of force is to use an exponential force profile 360, as shown in FIG. 5*b*, such as a squared function. The barrier force is only gradually increased until about a point XI, where the curve begins to increase more steeply. The user is presented with a barrier force that reaches the same magnitude of resistive force in about the same distance of knob movement; thus the barrier force feels as realistic as the traditional force of FIG. 5*a*. However, the gradual increase of force at the beginning of the barrier force range increases stability since it allows a user to move the knob into and out of the barrier force region with little interference or influence. In other embodiments, the gradual initial increase can be achieved using force profiles of different shapes. For example, two linear profiles can be used in succession, with the first profile (to point XI) having a lower slope than the later profile (past point X1).

Another barrier force implementation of the present invention provides a similar barrier force as shown in FIG. 5*b* (or alternatively as in FIG. 5*a*). However, in addition to the above-described barrier force, an impulse force can be output when the knob is initially moved against the barrier. The impulse force is preferably a decaying oscillation of resistive force, such as a vibration, played in summation with the barrier force; the impulse oscillation decays down to the level of the normal barrier force. A representation of an impulse oscillation 365 is shown in exaggerated frequency; ini actuality, the oscillation is of a high frequency that is almost imperceptible to the user, and is summed with the barrier force curve. Preferably, the oscillation is a time-based vibration that begins once the knob is moved to the barrier region and which plays out based on time, not knob position. Preferably, the initial magnitude of the oscillation force is proportional to the velocity of the knob as it enters the barrier. Thus, the more quickly the user moves the knob, the greater the magnitude of the impulse. The oscillation thus presents a high-frequency vibration in conjunction with the barrier force immediately upon the user's entry to the barrier. The vibration provides an enhanced sense of a rigid and solid barrier to the user. In some cases, the knob may be moved past the impulse force, but will then meet the more-gradual barrier force.

Alternatively or in addition to the impulse oscillation, a damping force can also be provided to resist knob motion when the knob first enters the barrier region. The damping force has a magnitude that is directly based on the current velocity of the knob. Thus, the faster the user moves the knob into the barrier, the greater the resistive damping force will be. This entry damping force can be output within the entire barrier region, or just at an initial area of the barrier region. In other embodiments, an initial impulse of force, such as a single pulse, can be output instead of an oscillation.

Another feature of a barrier force of the present invention provides a damping force for motion of the knob exiting the barrier region. The barrier force of FIG. 5 or FIG. 6 (as well as the oscillation and entry damping force) can be used in conjunction with this exit damping force. The exit damping force is applied in a direction opposite to the barrier force after the knob is within the barrier force region and when the knob exits the barrier force region, i.e., the damping force resists motion of the knob out of the barrier. The damping force ceases when the knob reaches the starting point of the barrier. This damping has the beneficial effect of reducing the amount of overshoot movement of the knob out of a barrier when the user releases or reduces a grip on the knob that is in the barrier region. For example, if no damping is used, the barrier force can sometimes be strong enough to cause the knob to rotate too far in the direction opposite to the barrier, causing a knob-controlled cursor to move too far and even into another menu. The damping force effectively slows the knob down so that it comes to rest at or very near the entry point of the barrier, which is typically what the user expects. If the knob is moving slowly, the damping force is negligible, and the user feels little resistance moving the knob out of the barrier.

Another feature of the barrier force of the present invention involves providing the maximum amount of force output allowed by the motor (or other actuator) while avoiding overheating the motor (this feature can be combined with the features of the barrier force of FIG. 5*b* or can be used with the barrier force of FIG. 5*a*). Every motor has a maximum force output, referred to herein as a "physical maximum", which the user can overcome if the user provides force of a greater magnitude opposing the motor's force. The physical maximum 362 is represented as a line in FIG. 5*b*, and is based on power dissipation characteristics of both the motor and the power amplifiers) feeding current to the motor. The motor cannot maintain force at the physical maximum without overheating motor components and/or the amplifiers, so that even if such force maintenance is tried, the force output will need to drop to a sustainable level to protect the functionality of the motor and amplifier.

Typically, barrier forces (and other spring forces and resistive forces) are assigned a "continuous maximum" or "saturation level" which is a level of force magnitude above which the actuator output will not increase. The continuous maxima 364 and 354 are shown in the profiles 350 and 360. The provider of the haptic feedback device (or the motor) has assigned the continuous maximum 364 as a force level at which motor force output can be maintained indefinitely without overheating the motor. As shown, the continuous maximum is typically well below the physical maximum of the motor.

In the present invention, another force level is preferably designated, the "instantaneous maximum," shown at 356 (in FIG. 5a) and 366 (in FIG. 5b). This force level is above the continuous maximum 354 or 364, but is preferably below the physical maximum 362 or 352. The motor cannot maintain the force level at the instantaneous level indefinitely, and over time the force level must fall back to the continuous maximum (or slightly above it) or the motor and/or amplifier will become damaged. However, the instantaneous level 362 or 352 can be useful in the output of barrier force sensations. A force resistance can be output at the instantaneous maximum when the knob is moved into the barrier. Since the user rarely maintains pushing the knob against the barrier force, but usually moves the knob back out of the barrier, the instantaneous level usually need not be maintained for very long. The greater magnitude, however, provides a more compelling barrier force that feels like a stronger barrier to the user. This feature of allowing greater force magnitude can also be implemented for other types of forces, such as vibrations, textures, jolts, etc.

If the user happens to continue to push the knob against the barrier force, then after a predetermined time, the force is preferably ramped smoothly down to a level that can be maintained indefinitely, such as at the continuous maximum 364. This ramping down is preferably made to occur before the motor overheats, as established in preliminary testing. In some embodiments, the local microprocessor or host microprocessor can sense motor characteristics to determine the proper time to ramp the force back down. For example, if the local microprocessor is given the winding resistance of the motor and the power dissipation characteristics of the motor amplifier, then the local processor can determine when to ramp down the force output based on the duration of force output and the amount of current sourced to the amplifier and motor. Alternatively, the local processor (and/or host processor) can examine temperature of the motor or components from a temperature sensor or other sensor from which temperature can be derived. The local microprocessor or host processor can use a variety of thermal models to determine when to ramp down the output force.

Other force sensations can be output to simulate ends of travel for the knob 26 or inform the user that the end of travel has been reached. For example, a jolt force can be output that is stronger in magnitude than normal detents, which informs the user that the end of a value range or other range has been reached. The user can then continue to rotate the knob in that direction, where a displayed value (such as a radio frequency) wraps around to the beginning value in the range.

State- and Event-Triggered Effects: Force effects can be triggered by manipulations of the knob by the user. For example, when the user pushes the knob to make a selection, a jolt force can be output. Preferably, the host processor need not command this force each time it is output; rather, firmware on the local processor monitors knob position and outputs such a triggered force when necessary. The local processor preferably implements firmware that can output effects based on the state of the knob, or based on events (changes in state) of the knob.

State-triggered effects are those force effects, which are output during a particular state, such as a state of a button. Thus, if a user maintained a button in a "pressed" state, a triggered force effect would be output as long as the button was maintained in such a state, and turned off when the button was released to an "unpressed" state. Or, an effect can be output while the knob was maintained at a particular position.

Event-triggered effects are those force effects, which are output based on a change in state. For example, such effects would be triggered when a button changes from a pressed state to an unpressed state, and could be triggered again when the button changes from an unpressed state to a pressed state. Such effects can be given a duration, so that if they are not commanded to cease within the duration, they are automatically stopped by the local microprocessor (state-triggered effects can also be assigned durations). Other changes in state that can trigger such effects include moving the knob from one detent position to another detent position when moving a cursor through a list of items.

Force Control Models

Below are described several force control "models" that provide particular selection functions when using a manipulandum, such as a rotatable knob, of a haptic feedback device. A "force model" may reference one or more individual force effects, such as detents, periodic effects, hills, envelopes, springs, barriers, dampers, and other effects. Many of these types of effects are described in greater detail in U.S. Pat. Nos. 5,734,373 and 6,147,674. The force model also may include behavior or rules for implementing the force effects included in the model based on conditions such as time, knob position, motion, velocity, etc.

Figure 6:
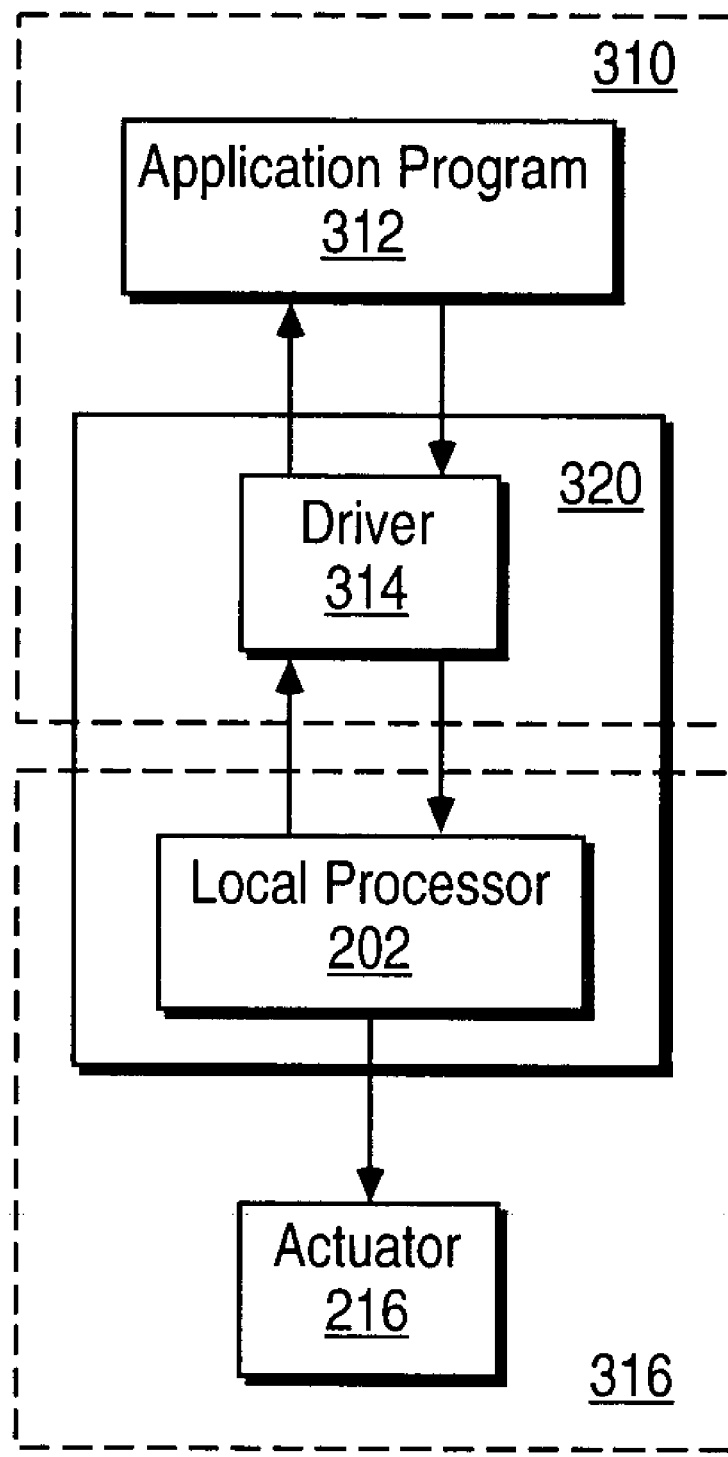
FIG. 6 is a block diagram of one example of a control architecture for the haptic feedback system for the present invention.

FIG. 6 is a block diagram of one embodiment of a haptic feedback system suitable for use with the present invention, in which force models are implemented. A host computer or host processor runs an application program 312 and a driver program 314. The application program 312 can control the images displayed on a display device, storage devices, and the overall functionality of the haptic feedback device and its interfacing with device or computer functions. In a vehicle, for example, the application program can display a list of items or selections, a map, animations, etc. on a display device and control the operation of the vehicular system selected by the user. In a host computer such as a personal computer or game console, the application program can be a game program, word processor, web browser, or other application.

The driver 314 can also be running in the host computer 310, e.g., on the host processor that also runs the application program 312. The application program 312 can provide force models to the driver 314. For example, the application program can define in the force model a scrolling list model (described below) and the detent force sensations, spring force sensations, etc. that are used by the scrolling list model. The driver then can independently handle control of the scrolling list model without further input from the application program. The driver 314 also provides position data or other position-related information based on sensor data received from the haptic feedback device 316 to the application program 312, which the application program uses to update its environment and/or functions. For example, if a scrolling list is implemented, the driver can provide the position in the list at which the knob is currently located.

The driver 314 controls the force model independently of the application program 312. The driver receives sensor positions from the local processor 202 describing where the knob (or other manipulandum) is currently positioned in its degree of freedom (velocity or acceleration data can also be sent to the driver 314 from the local processor 202, or can be computed by the driver). The driver can determine, for example, a list position from the sensor data and send the list position to the application program. The driver also determines which force effects should be output depending on the current conditions and dictated by the active force model (the driver can download the data for the effects to the local processor). The driver then sends commands to the local processor 202 to control the output of forces by the actuator 216 based on the received commands. For example, a "play" command causes the local processor to output those effects specified by the play command and stored in its memory.

Thus, the host computer 310 governs when the force effects in a force model are output in the described embodiment. The driver 314 and local processor 202 can collectively be called a "machine" 320 that interfaces with the application program 312 at a high level. In other embodiments, the application program can perform the driver functionality. Alternatively, the local microprocessor 202 can be given greater responsibility. For example, the force model (including all its behaviors and conditions) can be downloaded to the local microprocessor from the host to be partially or completely handled by the local microprocessor.

In some embodiments, an "envelope" can be provided around particular position ranges in a force model. Once the cursor or knob has been moved to pierce the border of the envelope, the driver or local processor knows to remove (or otherwise change) the force model or force effects being output. In some cases, the envelope can be a velocity and/or acceleration envelope, which causes a change in the output of a force model or effect when the rotational velocity or acceleration of the knob is outside a particular, predetermined range. For example, a particular force model or effects may only play in a desired velocity range—this can be useful to stop the output of detents when the knob reaches a barrier position.

Detent Model

The host processor implements the detent model by commanding detent effects to be output by the local processor (or directly output in other embodiments not including a local processor). This model can act as a base model for other models described herein. The host processor determines the shape of detents and their range in the rotational degree of freedom of the knob device. This determines how far the knob must be turned to move between detents, e.g., from one item in a list to another item. The host processor sends a command to the local processor indicating the detent positions and the local processor outputs the detent forces as appropriate. The host processor receives position information about the knob from the local microprocessor, and the host processor determines the current position of the knob in relation to the detents being generated on the device. As the device changes from one detent position to the next, the cursor position is controlled by the host in the displayed menu or other screen location. In other embodiments, a more sophisticated local processor can be provided with the detent shape and spacing information so that the local processor can determine the cursor position in the list or menu. The local processor can then provide this list position to the host processor, which updates the display.

Scrolling List Model

A scrolling list force model provides forces that assist a user in selecting items in a list or menu. FIG. 6 shows a schematic representation 310 of a scrolling list model of the present invention. The list 312 is represented by several displayed items A1, A2, A3, etc. in a display window 313, awry one of which can be selected by moving the knob 26 or other manipulandum, which moves a cursor 314 through the list. The cursor is used to highlight a menu item, where any item can be selected by the user when highlighted, e.g. by pushing on the knob. Preferably, each item has a force detent effect associated with it, where the detent biases knob motion to the center of the item and away from the borders between each item.

Only a number of the items in the list are displayed at any one time, e.g., only seven items in the scrolling list 312 are displayed (the "visible list"). However, many additional items are available in the list to be selected; e.g., items A8-A20. To access the additional items, the user moves the knob (e.g., clockwise) so that the cursor 314 reaches the border 316 of the visible list (which is preferably the border of an envelope that is positioned coextensively with the visible list portion 313). A spring force, represented by spring element 318, resists further motion of the knob past border 316. However, if the user does continue to move the cursor to compress the spring 318, a rate control mode is entered, in which the additional items A8-A20 are scrolled into the visible list 313, one at a time. Since the size of the visible list 313 is fixed, each new list item displayed in the visible list causes an old item to moved off the visible list as the list items are scrolled to the left, e.g., item A1 would disappear as items A2-A7 move left and item A8 appears at the rightmost position. The further that the user moves the knob into the spring 318, the greater is the spring force resistance, and the greater the speed of scrolling new items into the visible list 313.

Preferably, as each item is moved onto the list in rate control mode, a pop effect (or jolt) is output on the knob. The pop can be, for example, a single period of a square wave or other type of wave to provide the force impulse or jolt. Each jolt indicates to the user that another item has scrolled onto the list, and also tells the user the critical information about the current scrolling rate. The user can feel the rate of pops and correlate this directly with the scrolling rate, which is essential when operating the knob device without full attention to the selection process (e.g., as in a running vehicle).

In operation, the local microprocessor (or other controller) provides a fine positioning control and detent operation while the cursor is in the list 312. When the cursor moves to a border such as border 316, the processor turns off the detents and turns on the spring rate control forces. If envelopes are being used, the local microprocessor can turn on and off detents; alternatively, the host processor can read the knob position and turn on and off detents. Preferably, the host processor controls the pops during rate control mode. For example, a host processor displays the list 312 and implements the functions activated by a list selection. The host processor can provide a "pop" or jolt command to the local microprocessor each tune a pop is to be output in rate control mode. This functionality could in other embodiments be vested in the local microprocessor having a local memory, where the host processor downloads the spacing of the list items and other information required to output detents and pops.

Bounded List Model

A bounded list is similar to a scrolling list in that a number of successive items are presented for the user to select via movement of a cursor along the list. However, instead of providing the rate control borders as in the scrolling list, hard limits are used at each end of the list (e.g., at border 316 in FIG. 6). A barrier force can be output at each end of the list, such as a very stiff spring force, to indicate to the user that a limit has been reached. Alternatively, if multiple lists or menus are accessible by further, rotation of the knob, a hill force effect can be provided at one or both ends of the list, as explained above. The user can overcome the hill force to access the next menu.

Slider Model

This model can be made similar to the bounded list model. The user controls a value or function by rotating the knob, such as radio volume, balance of speakers, seat position in a vehicle, fan speed, etc. The knob's rotational range is preferably bounded with barrier forces, such as stiff springs. In addition, detents can be output at certain positions in the range of the knob; for example, a detent can be output at the center of the range to inform the user of the mid-point in the available range. Detents can also be positioned at one-quarter, one-eighth, or other divisions in the range. Furthermore, detents can be centered at user-preferred positions, such as favorite radio stations or channels. The host processor can read user preferences and thus determines which positions in the range are associated with force detents, and outputs commands to implement the detents when appropriate. Barriers can also be output at the ends of the range of rotation, controlled by the local processor. In addition, a damping force can be output to provide a resistance to the motion of the knob, e.g. to allow for fine positioning of the knob when the user is precisely controlling a value. In some embodiments, such as when controlling the speed of a fan in a temperature control unit, a vibration can be output on the knob, where the frequency and/or magnitude of the vibration is proportional to the amount of rotation from the origin position. In still other embodiments, slider models can be used to control a value or function that has no bounds and which wraps around to a beginning value. For example, when tuning a radio, radio frequencies can wrap from the highest frequency to the lowest frequency. In such an embodiment, no barrier forces need be output, although a detent, jolt, or other force effect can be output to signify to the user of the wrap-around event.

Jog Shuttle Model

The jog shuttle model allows a user a different control paradigm for scrolling through a list or controlling a function or value. The output force effects provide a simulated jog shuttle, in which the knob is provided with a centering spring force at all points of its rotation, the spring force biasing the knob toward an origin rest position. Thus, a spring force is preferably output when the knob is moved in either direction away from the origin position, and the spring force is output over the entire movement range of the knob.

Figure 7:
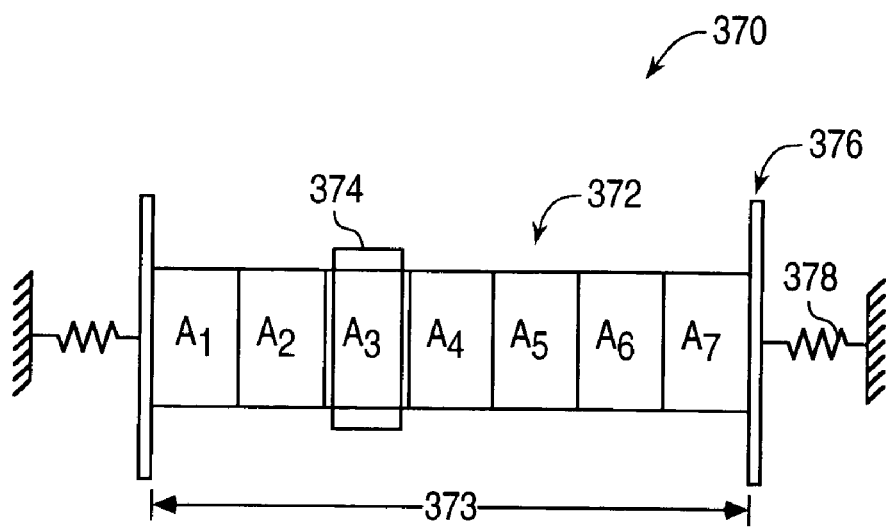
FIG. 7 is a diagrammatic illustration of a scrolling list force model of the present invention.

FIG. 7 is a force vs. position profile 390 illustrating a jog shuttle model of the present invention. To best simulate a mechanical jog shuttle having mechanical springs, the force feedback knob is preferably provided with two spring effects. The first spring effect, shown as curve 392, can be output over the entire range of the knob, and can have a medium amount of stiffness. The force resists motion away from the origin O and increases in magnitude as the knob is moved away from the origin until the saturation level is reached, at which point the force is no longer increased in magnitude but still resists motion away from the origin. The second spring, shown as curve 394, can overlap the first spring effect but is only in effect over a small range between positions −PI and P1 around the origin position. This provides the perception of a rotational preload. The second spring is preferably much stiffer than the first spring, requiring a greater amount of force from the user to overcome. This second spring provides a more "quality" feel to the knob since the knob is less likely to feel loose to the user around the origin position (the transition of moving from the second spring to first spring or vice-versa can be made not discernible by the user).

When the user moves the knob, a rate control paradigm is preferably implemented, where the greater the amount of rotation away from the origin position, the greater is the speed or rate of change of the controlled value or function. The jog shuttle model can be used to scroll through a list of items or a sequence of items or units, similarly to the rate control borders of the scrolling list model described above. In some embodiments, the host processor can output a pop for each item or division that scrolls by. The user can also in some embodiments be haptically notified when the knob is at the origin position by outputting a pop or detent force at the origin position.

Inertia Model

The inertial model provides a force on the knob to give the feeling of weight or heaviness to the knob. The inertial force permits the user to spin the knob with an initial motion and remove his or her hand from the knob, which allows the knob to continue to spin freely as if by inertia. Or, the user can tuna the knob quickly and then stop the knob; the knob will feel as if it wants to continue rotating due to the inertia force. To simulate inertia, the acceleration of the knob typically must be derived from changes in position or velocity of the knob, as is well known in the art. The inertial force can be affected by a simulated gravity, simulated friction, or other factors. The inertial force can also be enhanced with other forces such as pops or small detents.

Push-Turn Model

This model allows the user to select or adjust a function of a device by providing a dual motion: a push of the knob to translate it along its axis of rotation, combined with a twist or rotation of the knob. Before the knob is pushed, a high-magnitude force is preferably output, such as a barrier force, resisting the knob from turning. Once the knob is pushed, the host processor turns off the barrier force and the knob may be turned to make a selection or adjust some other device function. For example, when the cursor is over a particular item in a list, a push-turn of the knob can be required to select the next item rather than a simple turn of the knob. The pushing motion simulates having to move the knob "under" a gate or other obstruction. The host processor preferably monitors the knob for the push and turn combination in order to determine when to remove or turn on the barrier force. Preferably, a spring return force is provided in the translational degree of freedom, so that when the user stops pushing on the knob (e.g. after the turn of the knob), it returns to its original translational position before the push, and the resistive force is again output.

Push-Push Model

Figure 8:
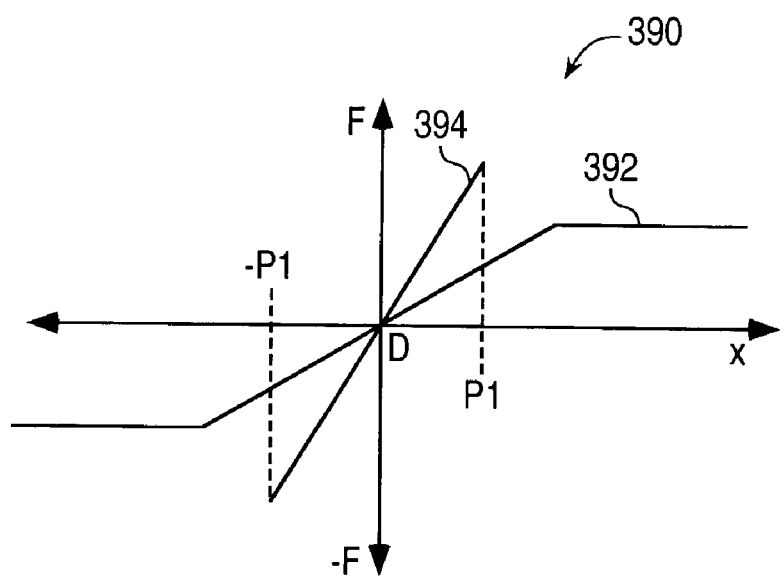
FIG. 8 is a diagrammatic illustration of a jog shuttle force model of the present invention.

This model allows the user to selector adjust a function of a device by providing a combination of springs. An example of a Push-Push profile 400 is shown in FIG. 8. For example, while rotating the knob clockwise (left to right), a first spring force at curve 402 is encountered that resists further clockwise motion. However, when the user pushes clockwise into the spring a predefined distance to a selection point P, the first spring is deactivated or the force is sloped down steeply, as shown. A short distance further clockwise, a second spring force is activated, shown by curve 404: The second spring force is preferably much stiffer (higher magnitude) than the first spring force and in the same direction as the first spring. When the user moves the knob to the selection point P, a selection of a function of a device can be performed. The second spring preferably acts as a barrier force to further knob motion. The activation of the second spring and deactivation of the first spring inherently provides a "click" sensation to the user, as if the knob has been rotated through a detent.

The Push-Push Model can be used for making a single selection, or can be used for other selection methods. For example, the user might use a push-push selection to enter a rate control mode. A physical-world analog to the push-push model is a magnetic cabinet door, which can be closed by moving the door against a spring magnetic contact. The door is pushed to compress the contact until a "click" is felt, after which the door reaches a physical barrier to further motion. This click indicates that the door is now locked or unlocked.

Cast Model

Figure 9:
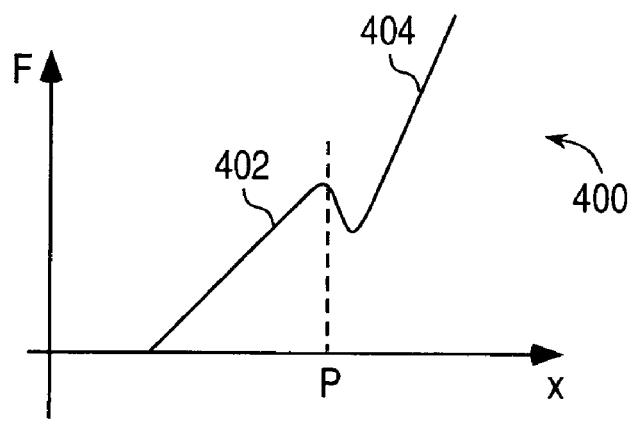
FIG. 9 is a diagrammatic illustration of a "push-push" force model of the present invention.
Figure 10:
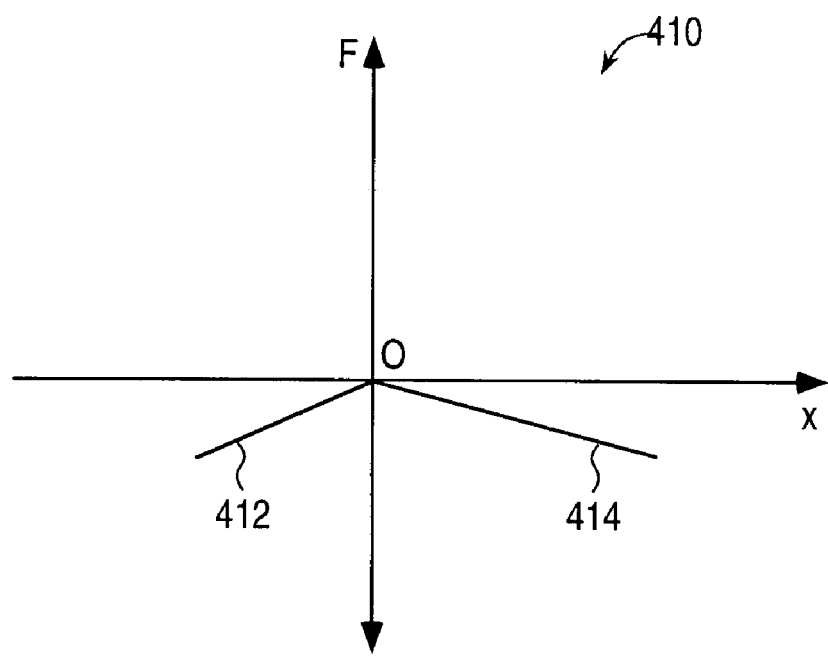
FIG. 10 is a diagrammatic illustration of a cast force model of die present invention.

The cast model provides forces that allow the user to manipulate a knob or other rotational manipulandum to perform a selection or move a cursor through a list. Preferably, the model acts so that the knob can simulate casting a fishing line using a rod and reel. In one embodiment, a light spring force or inertia force is output to resist motion of the knob from an origin position, e.g., in the counterclockwise direction. The user can rotate the knob a particular distance against this resistive force in a first motion and then can quickly rotate the knob in the opposite direction (e.g., clockwise) with a quick twist or a similar motion, as the second motion. This motion causes a cursor or other controlled object or value to move a particular distance or at a particular velocity through a list, across a screen, through a menu, through a range, etc. In some embodiments, a pop force can be output as the cursor moves past each item (or as the cursor moves past every X items, where X is a number above 1), from which the user can approximately determine how far through the list the cursor has moved. Thus, the user preferably makes both motions and continues to hold the knob as the "cast" is made. Some embodiments can provide an assistive force to the second motion, such as a spring force. One example of a cast force profile is shown in FIG. 9, in which a small resistive spring force, shown as curve 412, is provided for the first motion (left of origin O), and a small assistive force, shown as curve 414, is provided for the second motion (right of origin O).

For example, if the cursor is currently positioned over an "A" entry in an alphabetical list, the user can perform these motions to "cast" the cursor further into the list, such as to the letter "M." The further back the user moves the knob in the first motion, the further the cursor is moved, e.g. moving the knob all the way back in the first motion will move the cursor to the letter "Z." Alternatively, or in addition, the further the user moves the knob in the second motion, the further the cursor moves. The velocity of the second motion can also affect cursor motion in some embodiments, with faster motions causing the cursor to be moved a greater "distance" into the list and/or moved at a faster rate. This control scheme can also be used to adjust a value of a device such as volume or temperature, or to select a different menu or list.

Other Models

Other simple models can be combined with the above models or used independently. For example, one model allows the user to push the knob in or down along the z-axis, which causes a higher sensing resolution mode to be active. For example, the user may rotate the knob in its up or out position to control a cursor or value coarsely. When the cursor or value nears a desired value or spatial location, the user can push in the knob to allow finer control. Different force effects can be output depending on the mode, allowing the user to distinguish the current mode based on feel. For example, a different spacing and/or magnitude of detents can be output for the two different modes which indicates the current sensing resolution, e.g. a tighter spacing for a higher sensing resolution.

A different model provides a "pop" sensation whenever the user pushes the knob down on the z-axis (in some embodiments, a pop can also be output when the user moves the knob back up or lets it be moved up by a restoring force). The pop sensation can be output in the rotational degree of freedom about the rotational axis. The pop is preferably very short so that no adverse or undesired motion of the knob in the rotational degree of freedom is caused. For example, an impulse of force can be output quickly in one direction, then the opposite direction.

It should be noted that the force models and effects described above can be used in a variety of force feedback devices besides rotational devices like knobs, scroll wheels, and steering wheels. For example, these effects can be adapted for use with joysticks, mice, or other interface devices.

While this invention has been described in terms of several preferred embodiments, there are alterations, modifications, and permutations thereof, which fall within the scope of this invention. It should also be noted that the embodiments described above can be combined in various ways in a particular implementation or embodiment. Furthermore, certain terminology has been used for the purposes of descriptive clarity, and not to limit the present invention. It is therefore intended that the following appended claims include such alterations, modifications, and permutations as fall within the true spirit and scope of the present invention.

The invention claimed is:

1. A method, comprising:
   receiving a signal associated with a motion of a manipulandum in a degree of freedom;
   determining a position and a direction of the motion of the manipulandum in the degree of freedom based on the signal;
   outputting a first force signal if the determination indicates that the manipulandum moves towards a predetermined position in the degree of freedom; and
   outputting a second force signal if the determination indicates that the manipulandum moves away from the predetermined position in the degree of freedom.

2. A method as recited in claim 1 further comprising correlating the motion of the manipulandum with a motion of a cursor displayed in a graphical interface, wherein the predetermined position of the manipulandum corresponds with a border between a first feature and a second feature displayed in the graphical interface, each accessible by the cursor, and wherein the first force signal is output when the cursor moves from the first feature towards the border, and the second force signal is output when the cursor moves away from the border towards the second feature.

3. A method as recited in claim 2 wherein at least one of the first and second features comprises one of a screen, a menu, an object, and a visual function displayed in the graphical interface.

4. A method as recited in claim 2 wherein the first force signal is associated with a resistive force, and the second force signal is associated with an assistive force.

5. A method as recited in claim 4 wherein the resistive force is characterized by a first force function magnitude that increases as the position of the manipulandum approaches the predetermined position, and the assistive force is characterized by a second force function magnitude that decreases as the position of manipulandum retreats from the predetermined position.

6. A method as recited in claim 2 wherein the first force signal is associated with a first resistive force, and the second force signal is associated with a second resistive force.

7. A method as recited in claim 6 wherein the resistive first force is characterized by a first force function magnitude that increases as the position of the manipulandum approaches the predetermined position, and the second resistive force is characterized by a second force function magnitude that decreases as the position of the manipulandum retreats from the predetermined position.

8. A method as recited in claim 1 further comprising correlating the motion of the manipulandum with a motion of a cursor displayed in a graphical interface, and wherein the predetermined position of the manipulandum corresponds with a selection point displayed in the graphical interface, accessible by the cursor, and wherein the first force signal is output when the cursor moves towards the selection point, and the second force signal is output when the cursor moves away from the selection point.

9. A method as recited in claim 8 wherein the selection point is associated with one of a menu item, an object, a numeric value, and a visual function displayed in the graphical interface.

10. A method as recited in claim 1 wherein the degree of freedom comprises a rotary degree of freedom.

11. A computer-readable medium on which is encoded processor-executable program code, the computer-readable medium comprising:
program code to display a menu in a graphical interface, the menu including a displayed section and an undisplayed section, each having at least one menu item;
program code to correlate a motion of a cursor displayed in the graphical interface with a motion of a manipulandum;
program code to display at least a portion of the undisplayed section by the cursor; and
program code to output a force signal to a haptic actuator coupled to the manipulandum, when the at least one menu item in the undisplayed section is displayed.

12. The computer-readable medium of claim 11 wherein the force signal is associated with a jolt force.

13. The computer-readable medium of claim 11 further comprising program code to output a detent force signal when the cursor moves between two menu items in the displayed section.

14. The computer-readable medium of claim 11 further comprising program code to output a resistive force signal to the haptic actuator, wherein a magnitude of the resistive force increases with a rate at which the menu items in the undisplayed section are displayed.

15. The computer-readable medium of claim 14 wherein the resistive force comprises a spring force.

16. The computer-readable medium of claim 11 further comprising program code to output a barrier force signal when the cursor reaches an end of the undisplayed section.

17. The computer-readable medium of claim 11 wherein the manipulandum is movable in a rotary degree of freedom.

18. A computer-readable medium on which is encoded processor-executable program code, the computer-readable medium comprising:
program code to output a force signal, the force signal being associated with a force for resisting a rotation of a manipulandum about an axis of rotation;
program code to receive an input signal associated with a translation of the manipulandum along the axis of rotation relative to a predetermined position; and
program code to cease outputting the force signal when the input signal indicates the translation of the manipulandum relative to the predetermined position.

19. The computer-readable medium of claim 18 wherein the force comprises one of a barrier force and a spring force.

20. The computer-readable medium of claim 18 further comprising program code to output a jolt force signal when the input signal indicates the translation of the manipulandum relative to the predetermined position.

21. The computer-readable medium of claim 19 further comprising program code to output a spring force signal when the manipulandum completes a rotation, wherein the spring force is configured to enable the manipulandum to return to the predetermined position along the axis of rotation.

22. The computer-readable medium of claim 18 further comprising program code to correlate the rotation of the manipulandum with a motion of a cursor displayed in a graphical interface.

23. A computer-readable medium on which is encoded processor-executable program code, the computer-readable medium comprising:
program code to receive a signal associated with a displacement of a manipulandum from a predetermined position in a degree of freedom;
program code to increase a rate of change of a feature displayed in a graphical interface with the displacement; and
program code to output a force signal, the force signal being associated with a resistive force, and a magnitude of the resistive force correlated with the displacement.

24. The computer-readable medium of claim 23 wherein the feature comprises one of a numeric value and a function type displayed in the graphical interface.

25. The computer-readable medium of claim 23 further comprising program code to increase the magnitude of the resistive force with the displacement.

26. The computer-readable medium of claim 25 wherein the resistive force comprises one of a spring force and a barrier force.

27. The computer-readable medium of claim 23 further comprising program code to output a barrier force signal when the feature ceases to change.

28. The computer-readable medium of claim 23 wherein the degree of freedom comprises a rotary degree of freedom.

* * * * *

UNITED STATES PATENT AND TRADEMARK OFFICE
CERTIFICATE OF CORRECTION

| | | |
|---|---|---|
| PATENT NO. | : 7,327,348 B2 | Page 1 of 1 |
| APPLICATION NO. | : 10/641243 | |
| DATED | : February 5, 2008 | |
| INVENTOR(S) | : Alex Goldenberg et al. | |

It is certified that error appears in the above-identified patent and that said Letters Patent is hereby corrected as shown below:

Under U.S. Patent Documents, Page 2, Right Column, add the reference --5,479,577 A 5/1998 Couch et al--
Column 1, Line 46, the word "il1" should read --with--
Column 2, Line 30, the phrase "knob is continues" should read --knob continues--
Column 4, Line 6, the word "die" should read --the--
Column 13, Line 54, the word "pasta" should read --past a--
Column 24, Line 28, the word "tuna" should read --turn--
Column 24, Line 62, the word "selector" should read --select or--

Signed and Sealed this

Eleventh Day of November, 2008

JON W. DUDAS
*Director of the United States Patent and Trademark Office*